US010164910B2

(12) United States Patent
Ravindran et al.

(10) Patent No.: US 10,164,910 B2
(45) Date of Patent: Dec. 25, 2018

(54) METHOD AND APPARATUS FOR AN INFORMATION-CENTRIC MAC LAYER

(71) Applicant: Futurewei Technologies, Inc., Plano, TX (US)

(72) Inventors: Ravishankar Ravindran, San Ramon, CA (US); Asit Chakraborti, Pleasanton, CA (US); Syed Obaid Amin, Fremont, CA (US); Aytac Azgin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 158 days.

(21) Appl. No.: 15/208,840

(22) Filed: Jul. 13, 2016

(65) Prior Publication Data

US 2018/0019956 A1 Jan. 18, 2018

(51) Int. Cl.
*H04L 12/64* (2006.01)
*H04L 12/743* (2013.01)
(Continued)

(52) U.S. Cl.
CPC ...... *H04L 49/3009* (2013.01); *H04L 12/6418* (2013.01); *H04L 45/7453* (2013.01);
(Continued)

(58) Field of Classification Search
CPC ............... H04L 12/6418; H04L 45/742; H04L 45/7453; H04L 47/806; H04L 49/3009;
(Continued)

(56) References Cited

U.S. PATENT DOCUMENTS

| 5,938,736 A * | 8/1999 | Muller | H04L 29/06 370/392 |
|---|---|---|---|
| 8,204,060 B2 * | 6/2012 | Jacobson | H04L 45/748 370/392 |

(Continued)

FOREIGN PATENT DOCUMENTS

| CN | 104052667 A | 9/2014 |
|---|---|---|
| CN | 104137509 A | 11/2014 |

(Continued)

OTHER PUBLICATIONS

Foreign Communication From a Counterpart Application, PCT Application No. PCT/CN2017/089377, English Translation of International Search Report dated Sep. 27, 2017, 7 pages.

(Continued)

*Primary Examiner* — Eric Nowlin
(74) *Attorney, Agent, or Firm* — Conley Rose, P.C.

(57) ABSTRACT

A network element (NE) includes a receiver configured to receive an Information-Centric Media Access Control (i-MAC) frame, a processor operably coupled to the receiver and configured to determine whether an i-MAC table includes routing information for the i-MAC Based Frame, and a transmitter operably coupled to the processor and configured to route the i-MAC Based Frame based on the i-MAC table when the i-MAC table includes information corresponding to the i-MAC Based Frame, and route the i-MAC Based Frame based on a layer 2 (L2) MAC Address Table when the i-MAC table does not contain information corresponding to the i-MAC Based Frame.

16 Claims, 10 Drawing Sheets

(51) Int. Cl.
*H04L 12/927* (2013.01)
*H04L 12/935* (2013.01)
*H04L 29/08* (2006.01)

(52) U.S. Cl.
CPC ........ *H04L 47/806* (2013.01); *H04L 67/2842* (2013.01); *H04L 69/324* (2013.01); *H04L 2012/6448* (2013.01)

(58) Field of Classification Search
CPC ............. H04L 67/1097; H04L 67/2842; H04L 67/327; H04L 69/324; H04L 2012/6448; H04L 2209/60
See application file for complete search history.

(56) References Cited

U.S. PATENT DOCUMENTS

| | | | |
|---|---|---|---|
| 8,705,536 B2 * | 4/2014 | Subrahmaniam ... | H04L 47/2441 370/389 |
| 9,130,887 B2 * | 9/2015 | Mosko ................ | H04L 45/7457 |
| 9,253,087 B2 * | 2/2016 | Zhang .................... | H04L 45/74 |
| 9,282,050 B2 * | 3/2016 | Mosko ................. | H04L 47/365 |
| 9,379,975 B2 * | 6/2016 | Watanabe ............... | H04L 45/54 |
| 9,407,549 B2 * | 8/2016 | Mosko ................ | H04L 45/7453 |
| 9,729,669 B2 * | 8/2017 | Varvello ............... | H04L 67/327 |
| 9,906,447 B2 * | 2/2018 | Oran .................... | H04L 45/742 |
| 2002/0105545 A1 * | 8/2002 | Carter .................. | G06F 3/0481 715/752 |
| 2009/0199250 A1 * | 8/2009 | Assouline ............. | H04N 7/173 725/96 |
| 2010/0195655 A1 * | 8/2010 | Jacobson ................ | H04L 45/00 370/392 |
| 2013/0060962 A1 * | 3/2013 | Wang .................... | H04L 67/327 709/238 |
| 2013/0064246 A1 * | 3/2013 | Dharmapurikar ..... | H04L 49/351 370/392 |
| 2013/0227166 A1 | 8/2013 | Ravindran et al. | |
| 2013/0230047 A1 * | 9/2013 | Subrahmaniam ... | H04L 47/2441 370/392 |
| 2013/0242996 A1 * | 9/2013 | Varvello ............... | H04L 67/327 370/392 |
| 2013/0250958 A1 * | 9/2013 | Watanabe ............... | H04L 45/54 370/392 |
| 2013/0282920 A1 * | 10/2013 | Zhang .................... | H04L 45/74 709/238 |
| 2015/0117449 A1 * | 4/2015 | Mosko ................ | H04L 45/7453 370/392 |
| 2015/0117452 A1 * | 4/2015 | Mosko ................. | H04L 47/365 370/392 |
| 2015/0117453 A1 * | 4/2015 | Mosko ................ | H04L 45/7457 370/392 |
| 2015/0372947 A1 | 12/2015 | Xuan et al. | |
| 2016/0087881 A1 | 3/2016 | Ge et al. | |
| 2016/0094439 A1 * | 3/2016 | Ravindran ............ | H04L 45/306 709/238 |
| 2016/0164952 A1 * | 6/2016 | Tur Nyi .................. | H04L 67/10 709/219 |
| 2017/0134276 A1 * | 5/2017 | White .................... | H04L 45/742 |
| 2017/0201538 A1 * | 7/2017 | Solis ................... | H04L 63/1416 |
| 2017/0201577 A1 * | 7/2017 | Wood .................. | H04L 67/1095 |
| 2017/0257342 A1 * | 9/2017 | Mosko ................ | H04L 61/2046 |
| 2017/0289114 A1 * | 10/2017 | Wood .................... | H04L 9/3247 |
| 2017/0359260 A1 * | 12/2017 | Wood ................ | H04L 45/7453 |
| 2018/0011936 A1 * | 1/2018 | Mosko ................ | H04L 67/2842 |
| 2018/0019956 A1 * | 1/2018 | Ravindran .......... | H04L 12/6418 |

FOREIGN PATENT DOCUMENTS

| | | | | |
|---|---|---|---|---|
| CN | 104145457 A | * | 11/2014 | ......... H04L 47/2441 |
| CN | 104429038 A | | 3/2015 | |
| EP | 2043332 A2 | * | 4/2009 | ............. H04N 7/173 |
| EP | 2043332 A3 | * | 1/2011 | ............. H04N 7/173 |
| EP | 2823605 B1 | * | 9/2017 | |
| WO | WO-2013132395 A1 | * | 9/2013 | ......... H04L 47/2441 |

OTHER PUBLICATIONS

Foreign Communication From a Counterpart Application, PCT Application No. PCT/CN2017/089377, English Translation of Written Opinion dated Sep. 27, 2017, 5 pages.

* cited by examiner

METHOD AND APPARATUS FOR AN INFORMATION-CENTRIC MAC LAYER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network is a group of devices connected to each other. The Open System Interconnection (OSI) is a conceptual networking model for a network that standardizes the communication functions without regard to the underlying internal structure and technology. The OSI model comprising seven 'layers' each representing a controlled hierarchy where information is passed from one layer to the next creating a blueprint for how information is passed from physical electrical impulses all the way to applications supported by the network. A layer 2 (L2) network is built to run on the physical layer, OSI layer 1 (L1). L2 networks offer lower costs by only requiring switching, which means no routing gear is necessary. L2 networks also offer low latency as compared to a layer 3 (L3) network, which is built to run on an L2 network. L2 networks may be limited in size due to an increase in broadcast traffic creating congestion and thus decreasing network efficiency. A forwarding device, such as a network switch, applied to an L2 network forwards a data frame according to an address table. The address table is established according to a Media Access Control (MAC) address.

SUMMARY

Current Information Centric Networks (ICNs) are enabled over host-centric MAC, which is inefficient as request for content, services, etc., has to be mapped to a destination MAC. In a broadcast domain, names have to be mapped to MAC layer host-centric multicast addresses, which is not efficient or practical. To solve these and other issues, an i-MAC for ICN that also operates in an information-centric sense is proposed to meet the objectives of higher ICN layer protocols.

In an embodiment, the disclosure includes a network element (NE) including a receiver configured to receive an Information-Centric Media Access Control (i-MAC) frame, a processor operably coupled to the receiver and configured to determine whether an i-MAC table includes routing information for the i-MAC Based Frame, and a transmitter operably coupled to the processor and configured to route the i-MAC Based Frame based on the i-MAC table when the i-MAC table includes information corresponding to the i-MAC Based Frame and route the i-MAC Based Frame based on a layer 2 (L2) MAC Address Table when the i-MAC table does not contain information corresponding to the i-MAC Based Frame.

In an embodiment, the network element includes a cache configured to store received content from the i-MAC Based Frame, and wherein the content is encapsulated within an i-MAC enabled frame and transmitted in response to a request for the content. In an embodiment, the processor is configured to retrieve requested content from the i-MAC frame and determine whether corresponding content is stored within a cache. In an embodiment, the processor updates an interest-port when the content is not stored within the cache, when an i-MAC name table does not contain an entry for the i-MAC name, and after an entry is stored in the i-MAC name table for the i-MAC name. In an embodiment, interest ports are cleared and a content port is updated when the i-MAC name table contains an entry for a hash identifier.

In an embodiment, the processor checks an i-MAC type after receiving the i-MAC Based Frame from a network interface card (NIC) and determines if a forwarding flag is set to broadcast when an Information Centric Network (ICN) Payload of the i-MAC Based Frame includes an Interest Packet. In an embodiment, after a determination that an interest ports attribute is empty, the processor updates a source MAC field of the i-MAC Based Frame, broadcasts the i-MAC Based Frame via ports listed in a content ports attribute of an entry, and updates an interest ports attribute of the entry by adding the receiving port.

In an embodiment, the disclosure further includes a network element (NE) for transmitting an Information-Centric Media Access Control (i-MAC) including a memory and a processor operably coupled to the memory and configured to receive a content-centric interest packet via an Information-Centric Network (ICN) layer, use a content name extracted from the content-centric interest packet to generate an i-MAC name, and generate an i-MAC frame using the content-centric interest packet and the i-MAC name, and a transmitter operably coupled to the processor and configured to transmit the i-MAC frame toward a destination node.

In an embodiment, the processor is further configured to hash the content name extracted from the content-centric interest packet and to generate the i-MAC frame by inserting the content-centric interest packet into a Payload field of the i-MAC frame and the i-MAC name into a Name field of the i-MAC frame.

In an embodiment, the processor is further configured to generate the i-MAC frame by inserting a MAC address of the NE into a Source MAC field and set a Forwarding flag to a mode of forwarding of the content-centric interest packet. In an embodiment, the processor is further configured to determine that a mode of forwarding is set to broadcast, instruct the transmitter to broadcast the i-MAC frame, and create an entry in an i-MAC Name Table of the NE. In an embodiment, the processor is further configured to determine that a mode of forwarding is not set to broadcast and set a Destination MAC field to a MAC address of the destination node.

In an embodiment, the processor is further configured to determine that a mode of forwarding is not set to broadcast, retrieve a MAC address of the destination node from an Information Centric Address Resolution Protocol (i-ARP) reply, and set a Destination MAC field to a MAC address of the destination node.

In an embodiment, the processor is further configured to determine whether a Destination MAC field of an Information-Centric Media Access Control (i-MAC) Interest Frame is set to broadcast, retrieve an interest packet from an Information Centric Network (ICN) payload of the i-MAC Interest Frame when the destination MAC field is not set to broadcast, parse the i-MAC Interest Frame to obtain an i-MAC name from a Name field of the i-MAC Interest Frame and determine whether an entry in an i-MAC Name Table corresponding to the i-MAC name exists, create the entry in the i-MAC Name Table and retrieve the interest packet from an ICN Payload of the i-MAC Interest Frame when the entry does not exist, and update the entry in the i-MAC Name Table, retrieve the interest packet from an ICN payload of the i-MAC Interest Frame, and set a Source field in the interest packet to broadcast when the entry does exist, and wherein the transmitter is further configured to transmit the interest packet toward a destination node.

In an embodiment, a receiver operably coupled to the processor is configured to receive an i-MAC Based Frame prior to the determining step, wherein the i-MAC Based Frame is checked by the processor to determine an i-MAC type, wherein an i-ARP Reply is sent by the transmitter when the i-MAC Based Frame is an i-ARP Frame and there is an i-ARP Name match, and wherein the determination of whether the Destination MAC field of the i-MAC Interest Frame is set to broadcast is made by the processor when the i-MAC Based Frame is an Interest Frame.

In an embodiment, the disclosure further provides a content-host network element (NE) for handling an Information-Centric Media Access Control (i-MAC) content frame received within an i-MAC Layer of an i-MAC enabled network including a memory, a processor operably coupled to the memory and configured to parse a name field of the i-MAC Content Frame to obtain an i-MAC name corresponding to a requested content and to determine whether a Destination MAC field is set to broadcast, determine whether an entry in an i-MAC Name Table corresponding to the i-MAC name exists when the Destination MAC field is set to broadcast, update the i-MAC table with an inbound port of the i-MAC Content Frame, and retrieve a data packet from the i-MAC Content Frame, and determine whether a Destination MAC field of the i-MAC Content Frame references the NE when the Destination MAC field is not set to broadcast and retrieve the data packet from the i-MAC Content Frame when the Destination MAC field references the NE, and a transmitter operably coupled to the processor and configured to transmit the data packet toward a destination node when the data packet is retrieved from the i-MAC Content Frame.

In an embodiment, the processor is further configured to update a MAC Address Table with a record for the inbound port of the i-MAC Content Frame and a source MAC field from the i-MAC Content Frame.

In an embodiment, the processor is further configured to receive the i-MAC Content Frame from a network interface card (NIC) via an inbound port of the NE.

In an embodiment, the processor is further configured to hash a content name from a content-centric data packet to generate an i-MAC name, determine whether an entry in an i-MAC Name Table corresponding to the i-MAC name exists, generate an i-MAC Content Frame with a Destination MAC field set to broadcast and a source MAC field to a MAC address of the NE when the entry exists in the i-MAC Name Table, wherein the i-MAC name is inserted in a name field and the content-centric data packet is inserted in a payload field, and wherein the entry comprises a list of ports on the NE that have received an Interest Frame for the i-MAC name, generate the i-MAC Content Frame for each Interest Querier when the entry does not exist in the i-MAC Name Table, wherein the i-MAC name is inserted in a name field and the content-centric data packet is inserted in the payload field, and wherein the transmitter is further configured to transmit the i-MAC Content Frame to each corresponding Interest Querier when the entry did not exist in the i-MAC Name Table, and via each port when the entry existed in the i-MAC Name Table.

In an embodiment, each of the Interest Queriers is provided via an Information-Centric Network (ICN) layer, and wherein a receiver operably coupled to the processor is configured to receive the content-centric data packet via an Information-Centric Network (ICN) layer.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
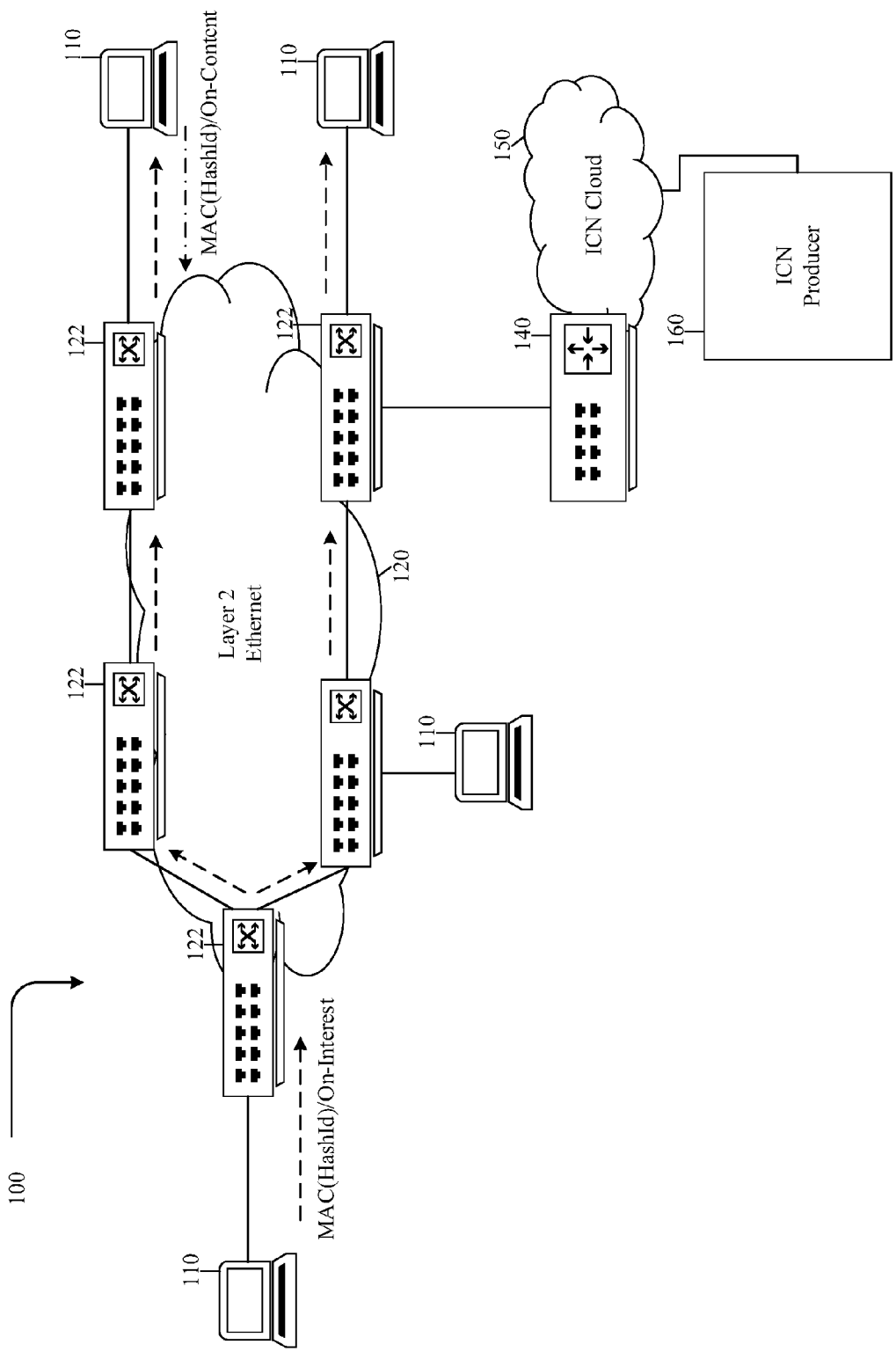
FIG. 1 is a schematic diagram of an embodiment of an Information-Centric MAC (i-MAC) enabled network system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

OSI L1 is the Physical Layer, which conveys a bit stream comprising an electrical impulse, light, or a radio signal, through the network at the electrical and mechanical level. The Physical Layer provides the hardware means of sending and receiving data on a carrier, including defining cables, cards, and physical aspects of the devices comprising a network.

OSI L2 is the Data Link Layer where data packets are encoded and decoded into bits thus moving the data across the physical links, OSI Layer 1, in the network. Adjacent network nodes in a wide area network or nodes on the same local area network employ the Data Link Layer to transfer data between them. The Data Link Layer is responsible for physical addressing, error correction, and preparing the information for the media. More specifically, the Data Link layer ensures that an initial connection has been set up between devices, divides output data into data frames, and handles the acknowledgements from a receiver that the data arrived successfully. The Data Link Layer also ensures that incoming data has been received successfully by analyzing bit patterns at special places in the frames. The Data Link Layer comprises two sublayers: the Media Access Control (MAC) Sublayer and the Logical Link Control (LLC) Sublayer. The MAC Sublayer governs protocol access to the physical network medium by controlling how a device on the network gains access to and/or permission to transmit data, while the LLC Sublayer controls frame synchronization, flow control, and error checking; manages communications links; and handles frame traffic. In a network, a switch is a device that redirects data messages at the Data Link Layer level.

OSI L3 is the Network Layer and provides switching and routing technologies and creates logical paths, known as virtual circuits, for transmitting data from node to node. Functions for the network layer include routing and forwarding, as well as logical addressing, internetworking, error handling, congestion control, and packet sequencing. OSI Layers 4-7 are host layers, which are outside the scope of the present disclosure.

On the Data Link Layer, devices can communicate within a single network only (e.g., L2 devices cannot span multiple networks), for multiple networks L3 support is required. Each device in a single network is identified uniquely. At Data Link Layer, unique identification is done via physical addressing scheme. A network interface card (NIC) is a circuit board or card that is installed in a device so that the device can be connected to a network. Each NIC has a unique physical address assigned to it known as MAC address. MAC address consists of 48 bits, written in hexadecimal form separated after 8 bits with either colon (:) or hyphen (-). For example, 00:40:48:5D:2B:32. MAC addresses are employed to provide each device with an L2 network a unique physical address by which the device is identified. A switch operating in a Data Link Layer network can locate a MAC address of both sending and receiving devices. By using the MAC addresses that are assigned to all ports on a switch, multiple devices on the same physical link can uniquely identify one another.

Within the OSI model, a frame refers to the encapsulated unit created at the Data Link Layer. A frame contains physical address information such as a source MAC address and a destination MAC address. Frames are transmitted to and received from devices on the same local area network (LAN). Unlike bits, frames have a defined structure and can be used for error detection and control plane activities. However, not all frames carry user data as a network may employ some frames to control the Data Link Layer itself. A packet, on the other hand, refers to the encapsulated unit created at the L3 Network Layer. A packet may contain logical address information. On an L2 network, a packet is encapsulated within a frame (e.g., the packet forms a data part of the frame). For example from a transmitting host device, data is first encapsulated within a packet, which is further encapsulated in a frame, which is then sent out over the physical layer as a bit stream.

At the Data Link Layer, unicast refers to sending frames from one node to a single other node, whereas multicast denotes sending traffic from one node to multiple nodes, and broadcasting refers to the transmission of frames to all nodes in a network. A broadcast domain is a logical division of a network in which all nodes of that network can be reached at Data Link Layer by a broadcast. Moreover, because Data Link Layer information is easily retrieved, Data Link Layer frames can be forwarded (switched) quickly, many times at the wire speed of the network. L2 switching, therefore, has little or no impact on network performance or bandwidth.

Communication among devices at the Data Link Layer may be done via an interconnecting device called a switch, which forms a connection between each host machine or network devices (e.g., routers, switches, wireless, etc.). A switch has a number of ports (typically 16 or 24), which are physical interfaces at which wires from various network devices or host machines connect. Devices in a network are connected to a switch (via the ports on the switch) which interconnects them, thus forming L1 inter-connection. Once the inter-connection is formed whenever any machine on the network sends a packet to any other machine, a source machine sends a frame to a switch, the switch then forwards the frame to a destination machine. Each frame that comes to the switch comprises a source and destination MAC address that the switch uses to forward the received packet to other devices. This process is known as Switching. For example, when a switch receives a frame from a device, the switch retrieves the destination MAC address. The switch then compares the destination MAC address with a MAC Address Table for a corresponding MAC address. If the destination MAC Address is found within the MAC Address Table, the frame is sent out to a port against which the destination MAC Address was matched. If an entry is not found for the destination MAC Address within the MAC Address Table (e.g., when the switch does not have a port mapping for the destination MAC address in the frame), the packet is sent out of all ports (e.g., flooded) except the port on which the frame originated.

Data Link Layer devices (e.g., switches) learn MAC addresses automatically and build a table (e.g., a MAC Address Table) which can be used to selectively forward frames received through various ports on the switch. For example, when a switch receives a frame from MAC address X on Port 1, the switch stores this information such that any received frames that are destined for MAC address X can be forwarded out of Port 1 rather than having to try each available port in turn.

Address Resolution Protocol (ARP) is a protocol for mapping an Internet Protocol address (IP address) to a physical machine address (e.g., MAC address) that is recognized in a local network. A table, which may be referred to as an ARP cache, is employed to maintain a correlation between each MAC address and a corresponding IP address. ARP provides the protocol rules for making this correlation and providing address conversion in both directions. The ARP messages within an Information Centric Network (ICN) based network may be referred to as ICN ARP (i-ARP).

Examples of other Data Link layer protocols are Ethernet for local area networks (multi-node), the Point-to-Point Protocol (PPP), High-Level Data Link Control (HDLC) and Advanced Data Communications Control Procedure (AD-CCP) for point-to-point (dual-node) connections. In the Internet Protocol Suite commonly known as Transmission Control Protocol/Internet Protocol (TCP/IP), the Data Link Layer functionality is contained within the link layer, the lowest layer of the descriptive model.

An ICN is a type of network architecture that focuses on information delivery. ICNs may also be known as content-aware, content-centric, or data specific networks. ICNs shift the Internet protocol (IP) communication model from a host-to-host model to an information-object-to-object model. The IP host-to-host model addresses and identifies data by storage location, for example, by host IP address, whereas the information-object-to-object model employs a non-location based addressing scheme that is content-based. The entities that are distributed or operated on in an ICN communication model are information objects. Some examples of information objects may include content, data streams, services, user entities, and/or devices. In an ICN, information objects are assigned with application-based names, which are used to address the information objects, decoupling the information objects from locations. Routing to and from the information objects are based on the assigned names. ICN provisions for in-network caching, where a wide variety of network devices or elements serve as temporary content server (CS). For example, ICN nodes may maintain pending interest tables (PITs), forwarding information bases (FIBs), and CSs for data forwarding.

In some cases, an ICN is enabled over the L2 MAC sublayer, which is currently host-centric. Such an ICN may comprise broadcast domains where content names are mapped to the L2 MAC sublayer multicast addresses, which is not efficient or practical. A broadcast domain is a logical division of a computer network, in which all nodes can reach each other by broadcast at the Data Link Layer. A broadcast domain can be within the same LAN segment or it can be bridged to other LAN segments. Such an implementation of an ICN is inefficient as a request for content or a service is mapped to a destination MAC, thus negating the application-centric nature of the ICN. Additionally, when multicast content flows are transported via an ICN network, the flows are transitioned to unicast at the edges of the network because the content flows are mapped to unicast faces of the edge devices. This transitioning may be a bottleneck within the ICN network.

Disclosed herein is an i-MAC Layer employed within an ICN that is based on self-learning and providing support for ICN multicast and broadcast, as well as other host-centric operations. Such an i-MAC Layer operates in an information-centric manner to meet the objectives of higher ICN layer protocols. An L2 network device, such as a switch, configured to implement an i-MAC Layer operates through a name table (e.g., i-MAC Name Table) in addition to a MAC Address Table when performing MAC addressing operations. Such an i-MAC Layer enables multicasting in the L2 MAC sublayer based on ICN layer naming semantics, packet primitives, and routing requirements. The i-MAC Layer is generic and, thus may be adapted to any L2 wired or wireless (e.g., cellular) protocols, as well as incremental in the sense that the i-MAC Layer may be enabled over current Ethernet standards. Such an i-MAC Layer and corresponding i-MAC protocols enable the utilization of an inexpensive L2 network to support the ICN layer. The i-MAC Layer will support both broadcast and unicast modes of forwarding. Broadcast mode may be employed for content traffic, while Unicast mode may be employed for a named service or named devices or gateways (e.g., for Internet of Things (IoT) scenario). In addition, interest multicast may be handled through Virtual Local Area Networks (VLANs) at L2 and the content multicast may be handled through the i-MAC table at L2.

FIG. 1 is a schematic diagram of an embodiment of an i-MAC enabled network system 100. The network system comprises ICN client nodes 110, i-MAC enabled L2 Ethernet 120, ICN cloud 150, and ICN Producer 160. ICN cloud 150 comprises ICN Gateway 140. As shown, the ICN cloud 150 couples the ICN Gateway 140 to the ICN Producer 160. In an embodiment, the ICN Producer 160 (e.g., Netflix, YouTube, etc.) is a producer or provider of content. I-MAC enabled L2 Ethernet 120 comprises i-MAC enabled switches 122 implementing i-MAC protocols and is communicatively coupled with ICN client nodes 110 and with ICN cloud 150 via the ICN Gateway 140. In various embodiments, i-MAC enabled L2 Ethernet 120 may be communicatively coupled with additional ICN Networks through ICN Gateways within the corresponding ICN networks. The underlying physical network of ICN cloud 150 and i-MAC enabled L2 Ethernet 120 may be any type of transport network, such as an electrical network and/or an optical network, and may comprise one or more network domains. ICN client nodes 110 may be any network device configured to act as an end user and may consume and/or provide services and/or contents within the i-MAC enabled network system 100. I-MAC enabled switches 122 are network devices configured to perform L2 switching through employing i-MAC protocols as described herein. ICN Gateway 140 is a network node configured to interface with other networks that employs different protocols. ICN Gateway 140 may be implemented on the same network node as the i-MAC enabled switch 122 to which the ICN Gateway 140 is communicatively coupled. In an embodiment, the i-MAC enabled L2 Ethernet 120 serves as the Data Link Layer for an L3 ICN network.

The ICN client nodes 110 and i-MAC enabled switches 122 are network devices configured to perform i-MAC L2 operations in the i-MAC enabled network system 100. Some examples of i-MAC L2 operations include creating i-MAC Based Frames for Interest and/or Data Packet received from an ICN L3 layer, distributing i-MAC Based Frames via a selected mode of communication (e.g., unicast, multicast, broadcast), and receiving and forwarding i-MAC Based Frames by employing a stateful L2 i-MAC Name Table, which stores relevant receiving and forwarding port information corresponding to an i-MAC Name for Content distributed via the i-MAC enabled network system 100.

ICN client nodes 110 are configured to operate within an L2 i-MAC Layer that services an above L3 ICN layer and may store and/or consume content and services within the i-MAC enabled network system 100. The i-MAC Layer operating on ICN client nodes 110 receives ICN L3 Content or Data Packets, wraps the received packets in an i-MAC Based Frame as an ICN Payload, and forwards the created Frame toward a destination(s) via the i-MAC enabled L2 Ethernet 120 based on an i-MAC Name Table and/or a MAC Address Table depending on the mode of commination for the frame. ICN client nodes 110 may also receive i-MAC Based Frames via a NIC. Received i-MAC Based frames may be decapsulated (e.g., removal of frame headers) and the payload sent to the above ICN L3 layer. Operations of ICN client nodes 110 within an i-MAC Layer are described more fully below.

In a similar manner, i-MAC enabled switches 122 are configured to operate within a L2 i-MAC Layer. I-MAC enabled switches 122 may support an ICN L3 layer or may be configured to operate solely in an i-MAC L2 Layer. I-MAC enabled switches 122 receive i-MAC Based Frames and determine routing for the i-MAC Based Frames based on information in an i-MAC Name Table, which stores stateful data corresponding to content/service provided by the i-MAC enabled network system 100. I-MAC enabled switches 122 may employ an L2 MAC Address Table to forward received i-MAC Based Frames when no information is contained in the i-MAC Name Table. Additionally, i-MAC enabled switches 122 may employ a cache to store received content. The stored content may be encapsulated within an i-MAC enabled Frame and sent as a response to a received request for content (e.g., an Interest Packet). Operations of i-MAC enabled switches 122 within an i-MAC Layer are described more fully below.

I-MAC enabled network system 100 may also be applied within a cellular network. In such an embodiment, the i-MAC Layer information can be used to schedule downstream multicast for client nodes requesting the same content. Within a cellular network, the i-MAC enabled network system 100 employs cross layer scheduling, where information from the i-MAC Layer maps content to a set of subscribers to schedule packets to the multicast in a same time slot or frequency.

Figure 2:
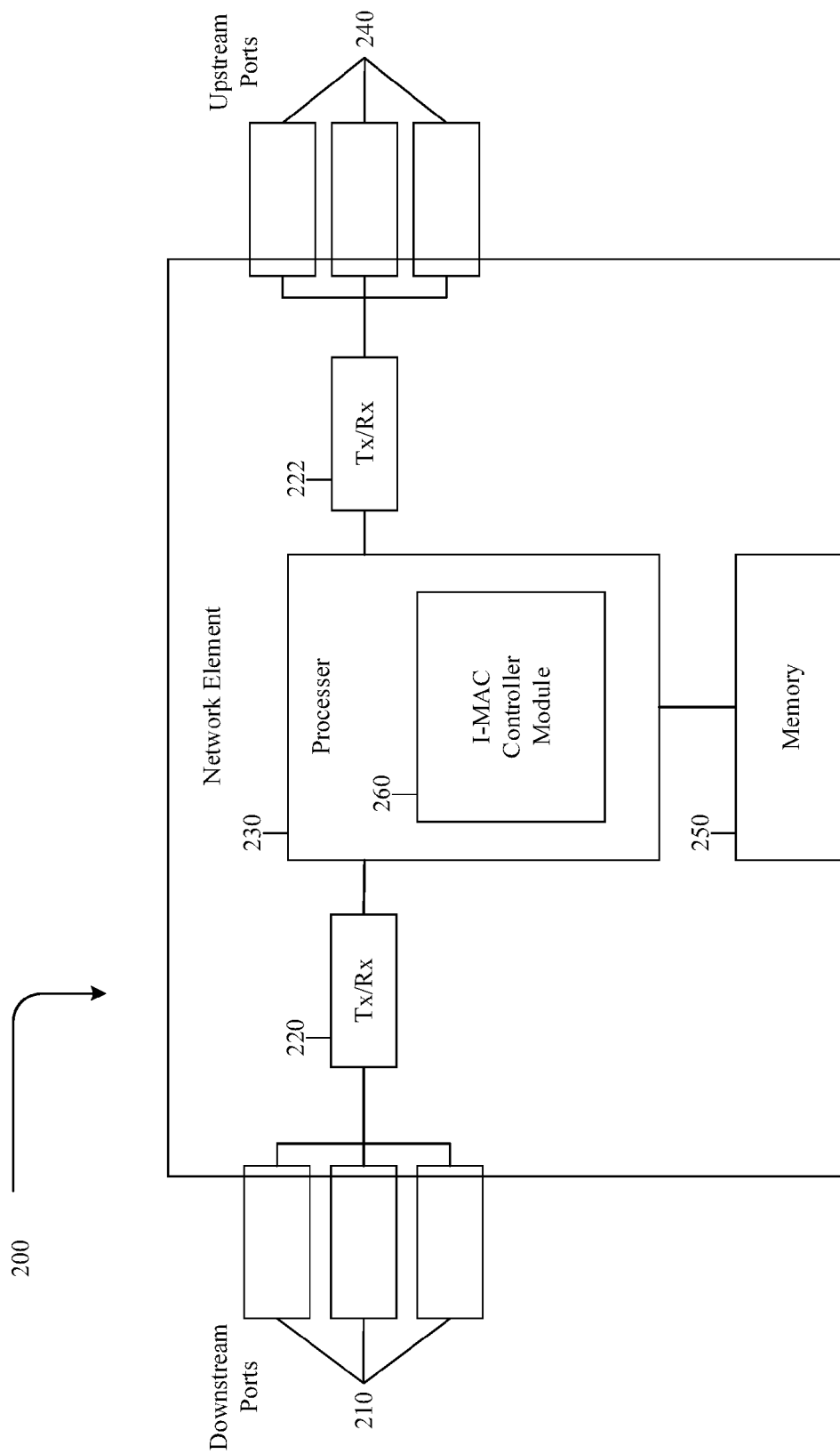
FIG. 2 is a schematic diagram of an embodiment of an Network Element (NE) configured to implement an i-MAC Layer in an i-MAC enabled network system.

FIG. 2 is a schematic diagram of an embodiment of an NE 200 configured to implement an i-MAC Layer in an i-MAC enabled network system, such as n i-MAC enabled network system 100. NE 200 may be implemented in a single node or the functionality of NE 200 may be implemented in a plurality of nodes (e.g., switches 122). One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 300. For instance, the features/methods in the disclosure may be implemented using hardware, firmware, and/or software installed to run on hardware. The NE 200 is any device that transports packets through a network (e.g., a switch, router, bridge, server, a client, a host, etc.).

As shown in FIG. 2, the NE 200 may comprise transceivers (Tx/Rx) 220 and 222, which are transmitters, receivers, or combinations thereof. A Tx/Rx 220 is coupled to a plurality of downstream ports 210 (e.g., downstream interfaces) for transmitting and/or receiving packets from other nodes and a Tx/Rx 222 coupled to a plurality of upstream ports 240 (e.g., upstream interfaces) for transmitting and/or receiving packets from other nodes, respectively. Downstream ports 210 and/or upstream ports 240 may contain electrical and/or optical transmitting and/or receiving components. A processing unit 230 is coupled to the Tx/Rxs 220 and 222 to process the packets and/or determine which nodes to send packets to. The processing unit 230 may comprise one or more multi-core processors and/or be coupled to a memory component 250, which function as data stores, buffers, Random Access Memory (RAM), Read Only Memory (ROM), etc. Processing unit 230 may be implemented as a general processing unit or may be part of one or more application specific integrated circuits (ASICs) and/or digital signal processors (DSPs). Processing unit 230 comprises an i-MAC Controller Module 260, which implements at least some of the methods discussed herein such as methods 500, 600, 700, 800, 900, and 1000 described below. In an alternative embodiment, i-MAC Controller Module 260 is implemented as instructions stored in memory component 250, which are executed by processing unit 230, or implemented in part in the processing unit 230 and in part in the memory component 260, for example a computer program product stored in a non-transitory memory that comprises instructions that are implemented by the processing unit 230. In another alternative embodiment, i-MAC Controller Module 260 is implemented on separate NEs. In an embodiment, NE 200 my comprise any other means for implementing the method 500-900 as described below.

It is understood that by programming and/or loading executable instructions onto the NE 200, at least one of the processing unit 230, i-MAC Controller Module 260, Tx/Rxs 220 and 222, memory component 250, downstream ports 210, and/or upstream ports 240 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
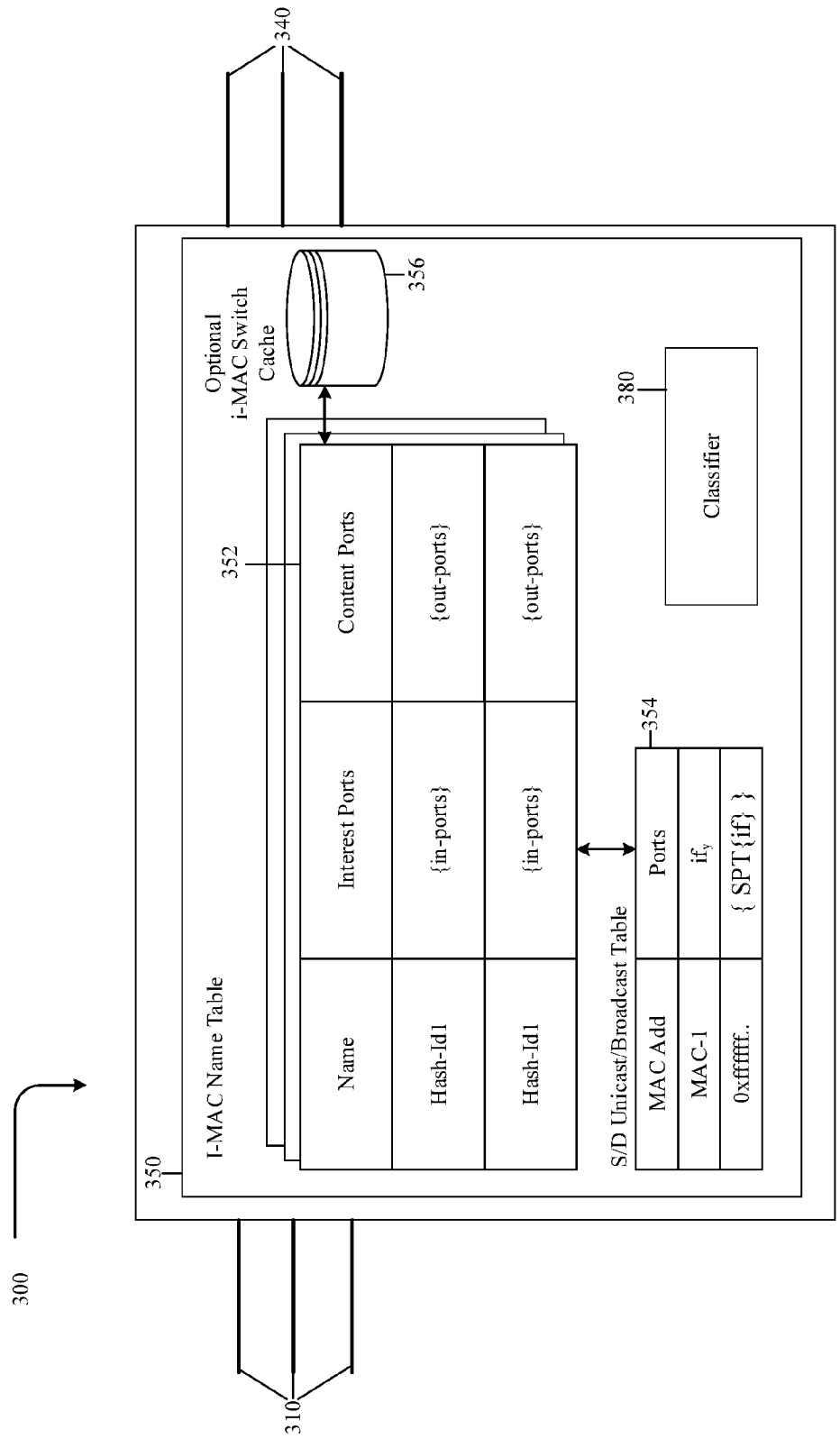
FIG. 3 is a schematic diagram of an embodiment of an NE that may act as a switch or client nodes in an i-MAC enabled network system.

FIG. 3 is a schematic diagram of an embodiment of an NE 300 that may act as a switch, such as switch 122, or client nodes, such as ICN client nodes 110, in an i-MAC enabled network system, such as i-MAC enabled network system 100. NE 300 is substantially similar to NE 200 in construction. NE 300 comprises a plurality of downstream ports 310 that are similar to downstream ports 210, a plurality of upstream ports 340 that are similar to upstream ports 340, and a memory component 350 that is similar to memory component 250. Memory component 350 comprises an i-MAC Name Table 352 and a MAC Address Table 354. Memory component 350 may also comprise an optional i-MAC switch cache 356, which may be employed as a Content Store.

Entries within the i-MAC Name Table 352 comprise a name attribute, an interest ports attribute, and a content ports attribute. The name attribute contains an i-MAC Name, which is a hash of a content name received via an Interest or Data Packet. The interest ports attribute stores a port number(s) corresponding to a port(s), such as upstream ports 310, where an Interest for content was received corresponding to the i-MAC Name. The content port attribute stores a port number(s) corresponding to the port(s), such as downstream ports 340, where a content packet corresponding to the i-MAC Name was received. The i-MAC Name Table 352 allows NE 300 to store stateful Date Link Layer (L2) information regarding requests for and delivery of content from the above or linked ICN (L3) layer. Thus, NE 300 is able to support ICN multicast and broadcast on the Data Link Layer.

The MAC Address Table 354 is populated in the manner described, supra. Entries in the MAC Address Table 354 comprise a MAC address field and a ports field. The MAC address field stores a MAC address assigned to a device with the network. The ports field stores a port(s) where a frame sent from the MAC address was received by the NE 300.

In an embodiment, the memory 350 in the network element 300 includes a classifier 380. The classifier 380 determines if a packet is an interest packet, a data packet, or an Information Centric Address Resolution Protocol (i-ARP) packet. In addition, the classifier 380 is able to map Information Centric VLANs (i-VLAN) to the ICN L2 network. In circumstances where there are multiple i-VLANs, the memory 350 includes a corresponding number of i-MAC Name Tables 352, each of which corresponds to one of the i-VLANs.

In a broadcast ICN operation, the i-MAC Name Table 352 is employed to identify a set of ports where the content can be found. In such an operation, when the i-MAC Name Table 352 does not contain an entry for the requested content, then the received Interest Frame for the content is broadcast based on the MAC Address Table 354. More specifically, when the i-MAC Name Table 352 does not contain an entry for the requested content the NE 300 distributes the received Interest Frame for the content based on a corresponding entry(ies) in the MAC Address Table 354 corresponding to a destination MAC address contained in the received Interest frame. The MAC Address Table 354 is also employed when host-oriented operation is appropriate, such as for unicast routing and i-ARP resolution. In an embodiment, i-MAC switch cache 356 may be configured to store received content when NE 300 does not employ an ICN (L3) layer. When the NE 300 employs an ICN (L3) layer, NE 300 may cache received content at the ICN layer and may not store the content at the i-MAC (L2) layer.

Figure 4:
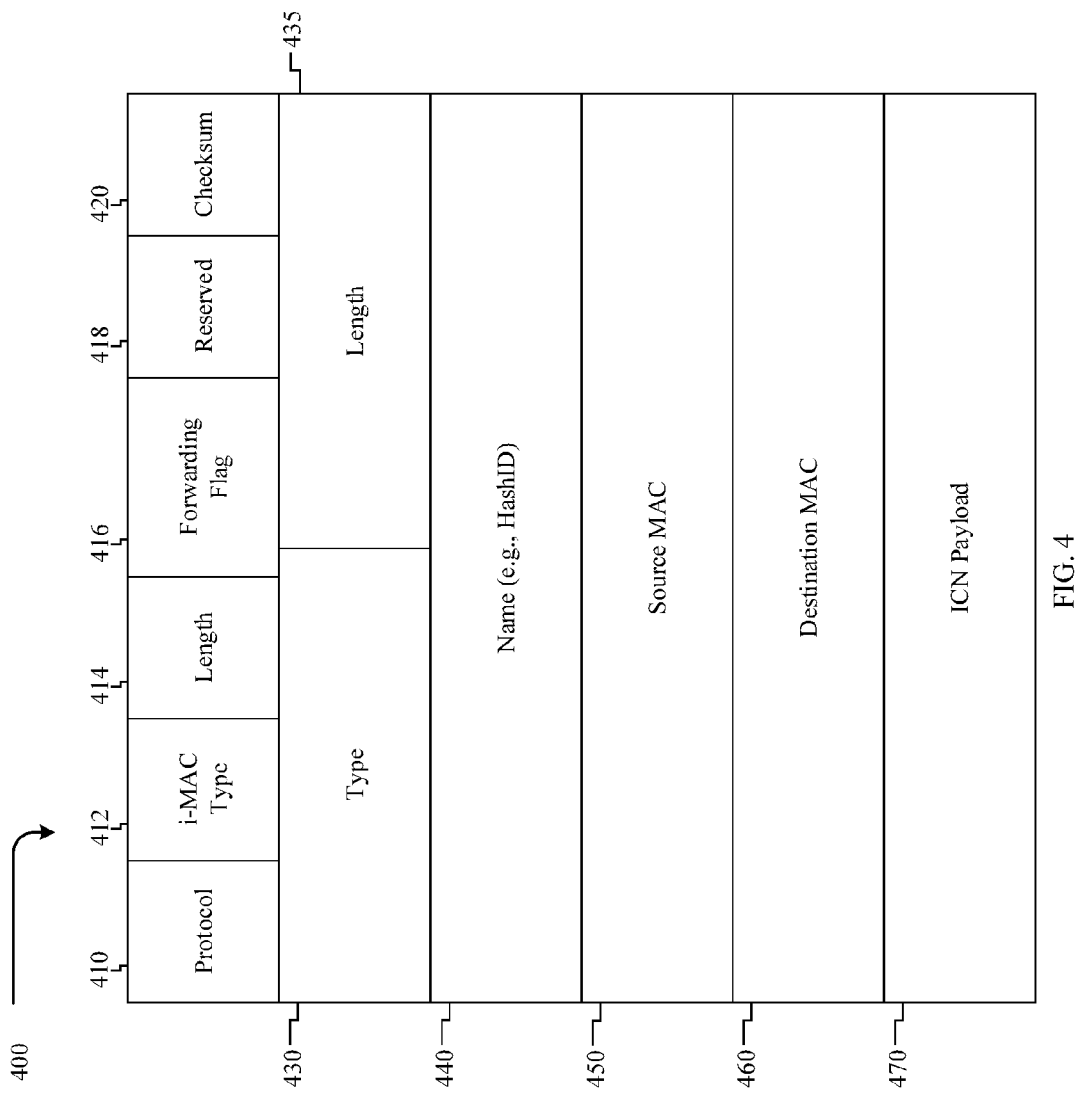
FIG. 4 is a schematic diagram of an embodiment of an i-MAC Based Frame employed by an NE in an i-MAC enabled network system.

FIG. 4 is a schematic diagram of an embodiment of an i-MAC Based Frame 400 employed by an NE, such as switches 122, ICN client nodes 110 and NEs 200 and 300, in an i-MAC enabled network system, such as i-MAC enabled network system 100. The i-MAC Based Frame 400 may be employed to wrap packets created at the ICN layer. The i-MAC Based Frame 400 comprises a Protocol field 410, an i-MAC Type field 412, a Length field 414, a Forwarding Flag field 416, and Reserved field 418, and a Checksum field 420, which may be collectively referred to as the fixed header of the i-MAC Based Frame 400. The i-MAC Based Frame 400 also includes a Type field 430, a Length field 435, a Name field 440, a Source MAC field 450, a Destination MAC field 460, and an ICN Payload field 470. Protocol field 410 indicates the type of payload included within the frame. In an embodiment, Protocol field 410 is set to "ICN" to signify that the frame includes an ICN payload. I-MAC Type field 412 indicates the primitive type of the ICN payload. In an embodiment, i-MAC Type filed 412 may be set to "Interest" or "Data." Length field 414 indicates the total length of the complete contents of the i-MAC Based Frame 400. Forwarding Flag field 416 indicates the type of communication being employed between the host and client devices. In an embodiment, Forwarding Flag field 416 may be set to Unicast, Multicast, or Broadcast to signify the type of communication between the host and client devices. Forwarding Flag field 416 may be left blank or set to zero when the payload of the i-MAC Based Frame is a Data Packet. Reserved field 418 is included to allow for future expansion of the protocol and may be set to zero. Checksum field 420 indicates a checksum of the complete contents of the i-MAC Based Frame Format 400. Type field 430 indicates the type of hash employed for the Name field 440. The type of hash may be, for example, a hash of a name or a universal resource locator (URL). The second Length field 435 indicates the length of the Name field 440. Name field 440 indicates the name, which may be hashed, of the content being requested by an Interest Packet included in the i-MAC Based Frame payload or contained within the Data Packet included in an i-MAC Based Frame payload. Source MAC field 450 indicates the MAC address of the device that generated or forwarded the i-MAC Based Frame. Destination MAC field 460 indicates the destination MAC address of the devices to which the i-MAC Based Frame is being sent. Source MAC field 450 and Destination MAC field 460 may be left blank or set to "Broadcast" and are thus optional when the Forwarding Flag field 416 is set to "Broadcast." ICN Payload field 470 includes the payload of the i-MAC Based Frame.

Figure 5:
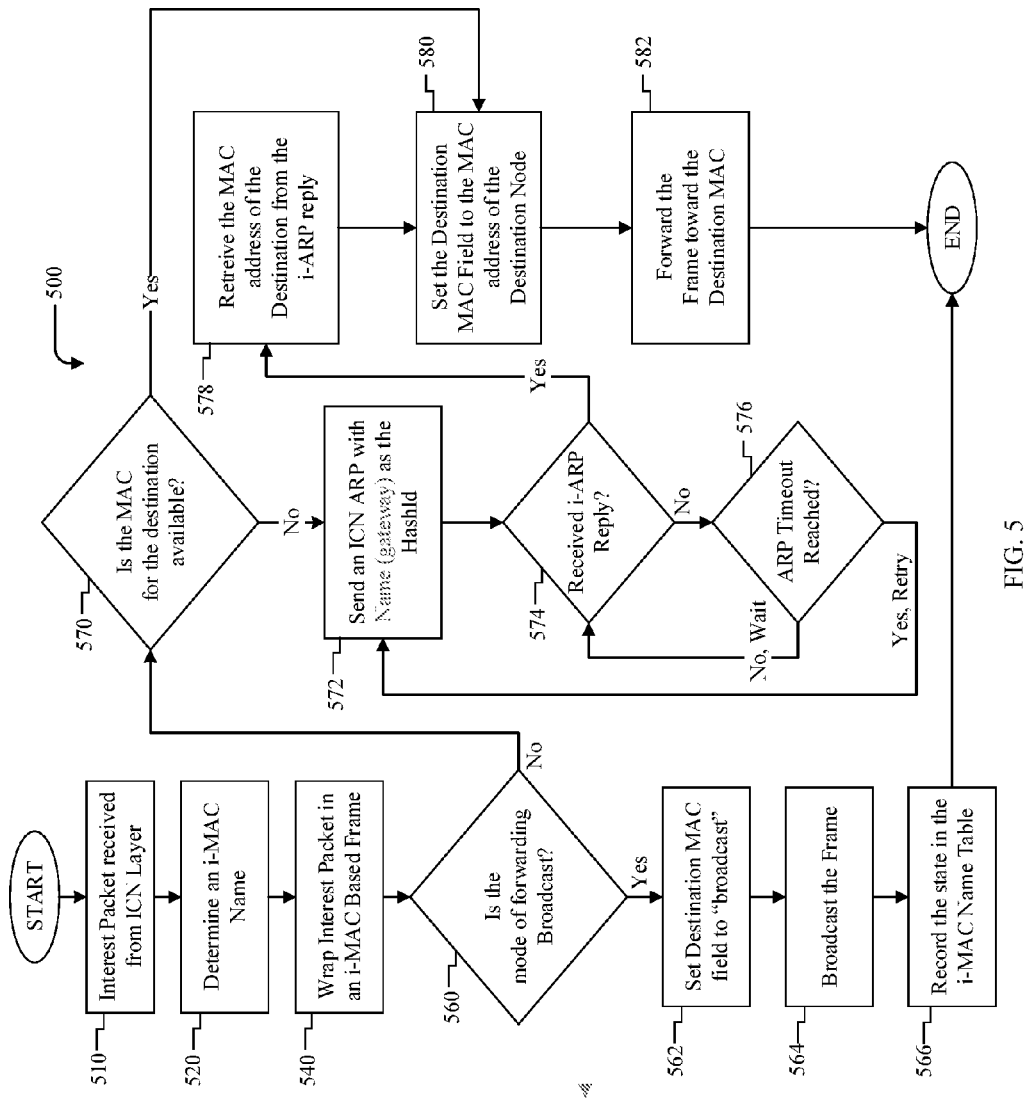
FIG. 5 is a flowchart of an embodiment of a method of sending an i-MAC Based Frame that includes a content-centric Interest Packet payload from a content-host NE within an i-MAC Layer of an i-MAC enabled network system.

FIG. 5 is a flowchart of an embodiment of a method 500 of sending an i-MAC Based Frame, such as i-MAC Based Frame 400, that includes a content-centric Interest Packet payload (referred to hereinafter as "i-MAC Interest Frame") from a content-host NE within an i-MAC Layer of an i-MAC enabled network system, such as i-MAC enabled network system 100. The method 500 is implemented by the content-host NE such as ICN client nodes 110, i-MAC enabled switches 122, and/or NEs 200 and 300 within an i-MAC Layer. The method 500 is implemented when the content-host NE receives a content-centric Interest Packet from an ICN Layer. At step 510, the NE receives a content-centric Interest Packet from an ICN layer. At step 520, the NE determines an i-MAC Name by hashing the name for the requested Content (Content Name) from the content-centric Interest Packet. At step 540, the NE creates an i-MAC Interest Frame by creating an i-MAC Based Frame, such as i-MAC Based Frame 400, and setting the ICN Payload field to the received content-centric Interest Packet, the Name field to the i-MAC Name, the Source MAC field to the MAC address of the NE, and the Forwarding Flag field to the mode of forwarding of the content-centric Interest Packet (e.g., unicast, broadcast, or multicast). VLANs may be used for further virtualization to support multicast. Indeed, the i-MAC Name Table may map names to the set of ports (along with the tag) to separate the broadcast to a segment in the L2 network. In this manner, an interest that reaches only a subset of ICN nodes connected over the L2 network may be achieved.

At decision step 560, the NE determines whether the mode of forwarding of the content-centric Interest Packet is broadcast. When the mode of forwarding is broadcast, the NE moves to step 562. At step 562, the NE sets the Destination MAC field of the i-MAC Interest Frame to "Broadcast." At step 564, the NE broadcasts the i-MAC Interest Frame via the outbound ports of the NE. At step 566, the NE creates an entry in an i-MAC Name Table, such as i-MAC Name Table 352. The name attribute of the stored entry is set to the i-MAC Name and the outbound ports are stored in the interest ports attribute. After step 566 is completed the method ends.

Returning to decision step 560 when the mode of forwarding is not broadcast, the NE moves to decision step 570. At step 570, the NE determines whether a MAC address for the destination node is available. When the MAC address for the destination node is not available, the NE proceeds to step 572. At step 572, the NE sends an i-ARP message with the Name (gateway) as the i-MAC Name (e.g., HashID). At step 574, the NE determines if an i-ARP reply has been received. When an i-ARP reply has been received, the NE proceeds to step 578. If an i-ARP reply has not been received, the NE proceeds to step 576. At step 576, the NE determines if an ARP timeout has been reached for the sent ARP message. When the ARP timeout has been reached the NE proceeds back to step 572. If the ARP time out has not been reached the NE continues to wait and proceeds back to step 574. At step 578, the NE retrieves an equivalent i-ARP as the destination MAC from the i-ARP reply and proceeds to step 580.

Returning to decision step 570 when the MAC address for the destination node is available, the NE proceeds to step 580. At step 580, the NE sets the Destination MAC field to the MAC address of the destination node or the i-ARP equivalent received from the i-ARP reply. In an embodiment, this information is cached in the i-ARP table. At step 582, the NE forwards the i-MAC Interest Frame to the Destination MAC address or the i-ARP equivalent received from the i-ARP reply and the process ends.

Figure 6:
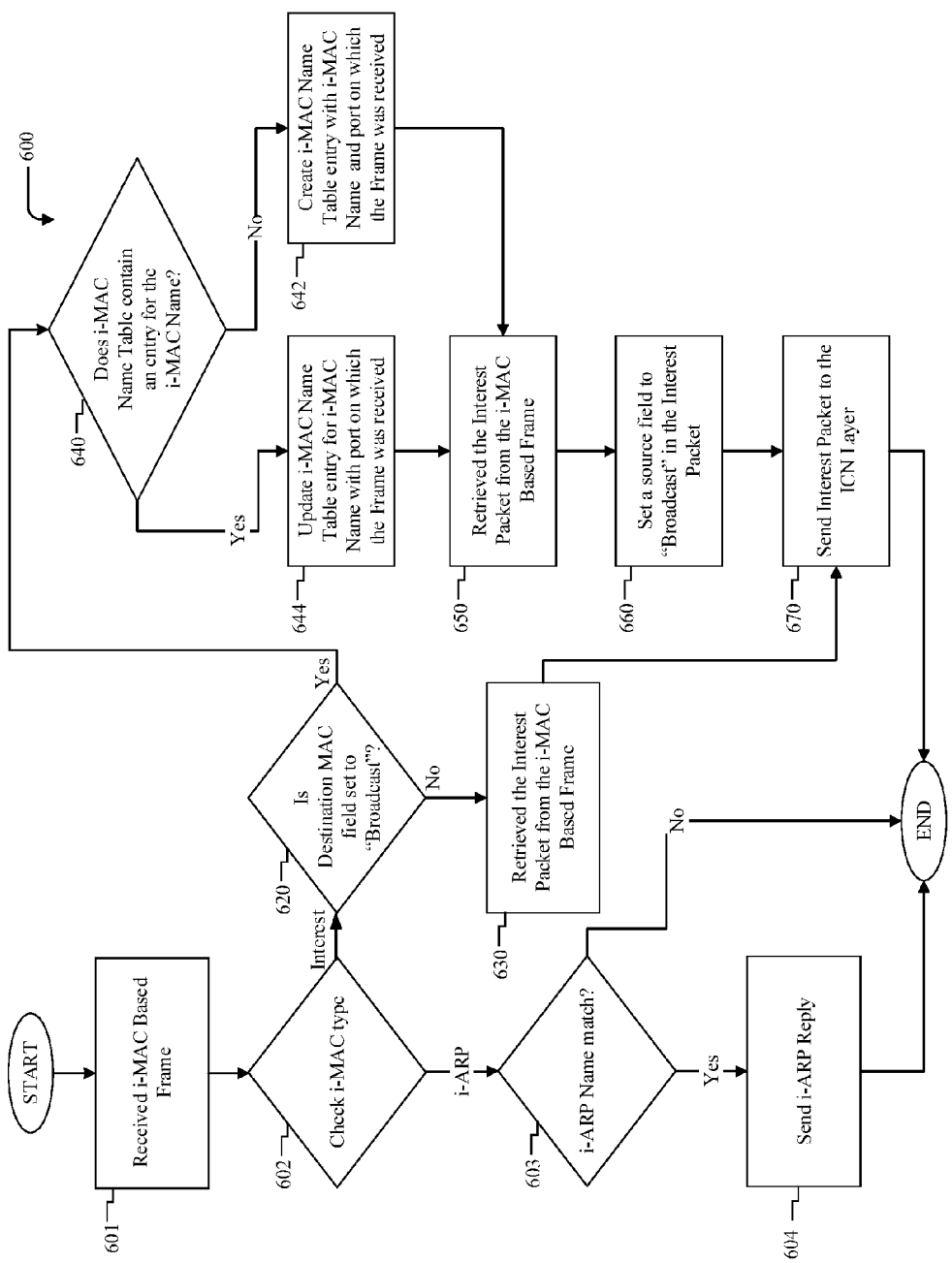
FIG. 6 is a flowchart of an embodiment of a method of handling a received i-MAC Interest Frame by a content-host NE within an i-MAC Layer of an i-MAC enabled network system.

FIG. 6 is a flowchart of an embodiment of a method 600 of handling a received i-MAC Based Frame by a content-host NE within an i-MAC Layer of an i-MAC enabled network system, such as i-MAC enabled network system 100. The method 600 is implemented by the content-host NE such as ICN client nodes 110, i-MAC enabled switches 122, and/or NEs 200 and 300 within an i-MAC Layer. The method 600 is implemented when the content-host NE receives an i-MAC Based Frame from an NIC via an inbound port. At step 601, the NE receives an i-MAC Based Frame. At step 602, the I-Mac Based Frame is checked to determine the i-Mac type. If the I-Mac Based Frame is an Interest Frame, the method proceeds to step 620, which will be discussed in further detail below. If the I-Mac Based Frame is an i-ARP Frame, the method proceeds to step 603. At step 603, a determination is made whether there is an i-ARP name match. If there is not, then the method ends. If, however, there is a match, the method proceeds to step 604 and an i-ARP reply is sent.

At decision step 620, the NE determines if the Destination MAC field of the received i-MAC Interest Frame is set to "broadcast." When the Destination MAC field of the received Interest Frame is not set to "Broadcast," the NE proceeds to step 630. At step 630, the NE retrieves the Interest Packet from the ICN payload of the Interest Frame (e.g., strips the Interest Frame headers) and proceeds to step 670.

Returning to decision step 620 when the Destination MAC field of the received i-MAC Interest Frame is set to "Broadcast," the NE proceeds to decision step 640. At decision step 640, the NE parses the Name field of the i-MAC Interest Frame for an i-MAC Name corresponding to a requested Content Name and determines whether an entry corresponding to the i-MAC Name is in an entry in an i-MAC Name Table, such as i-MAC Name Table 352. When an entry corresponding to the i-MAC Name does not exist in the i-MAC Name Table, the NE proceeds to step 642. At step 642, the NE creates an entry in the i-MAC Name Table. The NE sets the name attribute to the i-MAC Name and the interest ports attribute to the inbound port. The NE then proceeds to step 650.

Returning to decision step 640, when an entry corresponding to the i-MAC Name exists in the i-MAC Name Table, the NE proceeds to step 644. At step 644, the NE updates the interest ports attribute of the entry by adding the inbound port and proceeds to step 650. At step 650, the NE retrieves the Interest Packet from the ICN Payload field of the Interest Frame (e.g., strips the i-MAC Frame headers). At step 660, the NE sets a Source field in the Interest Packet to "Broadcast." At step 670, the NE sends the retrieved Interest Packet to the ICN layer and the method ends.

Figure 7:
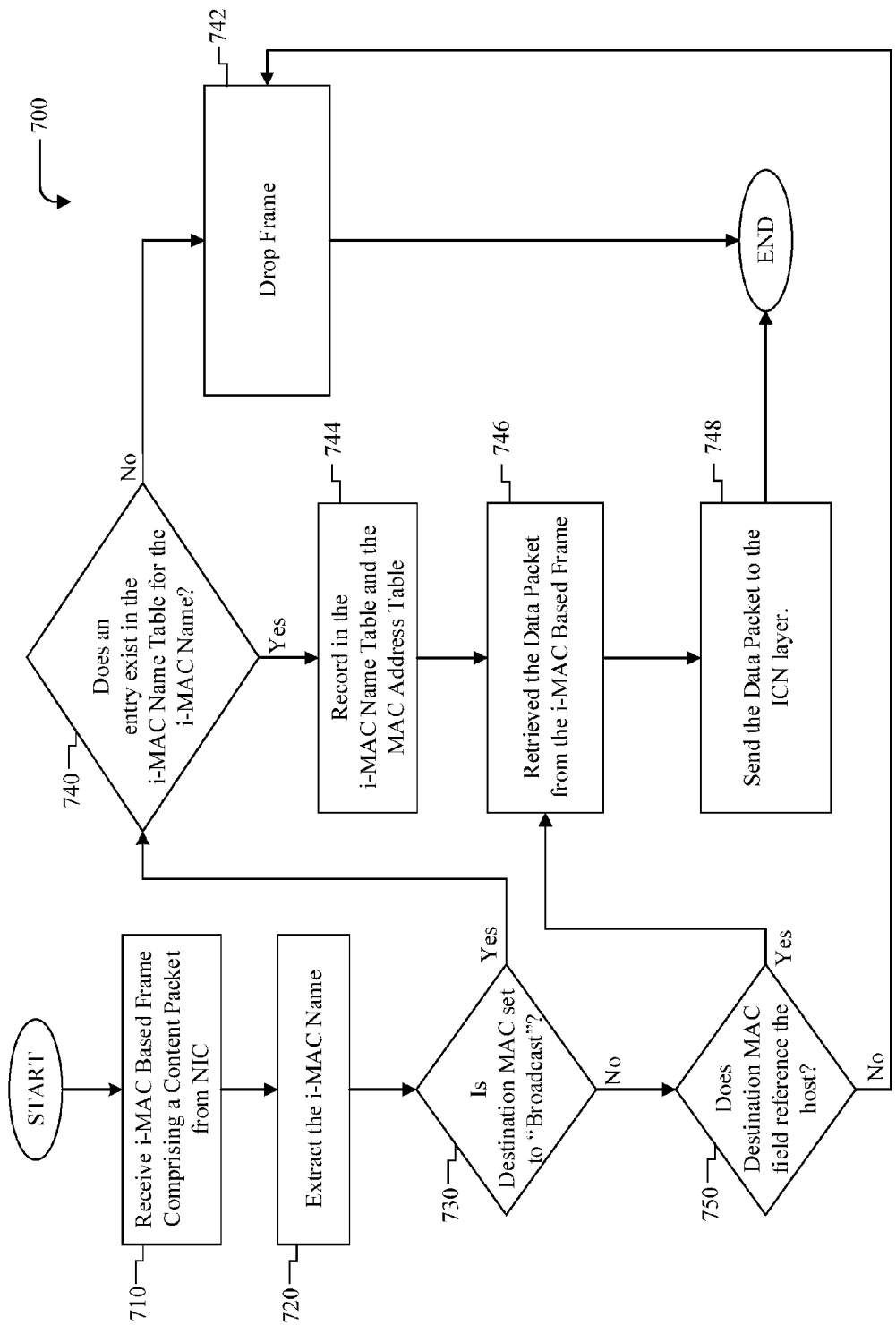
FIG. 7 is a flowchart of an embodiment of a method of handling a received i-MAC Based Frame that includes a Data Packet payload by a content-host NE within an i-MAC Layer of an i-MAC enabled network system.

FIG. 7 is a flowchart of an embodiment of a method 700 of handling a received i-MAC Based Frame, such as i-MAC Based Frame 400, that includes Data (e.g., Content) Packet payload (herein after referred to as "i-MAC Data Frame") by a content-host NE within an i-MAC Layer of an i-MAC enabled network system, such i-MAC enabled network system 100. The method 700 is implemented by the content-host NE such as ICN client nodes 110, i-MAC enabled switches 122, and/or NEs 200 and 300 within an i-MAC Layer. The method 700 is implemented when the content-host NE receives a Data Frame from an NIC via an inbound port. At step 710, the NE receives an i-MAC Data Frame from an NIC via an inbound port. At step 720, the NE parses the Name field of the i-MAC Data Frame for the i-MAC Name corresponding to a requested Content Name. At decision step 730, the NE determines if the Destination MAC field of the i-MAC Data Frame is set to "Broadcast." When the Destination MAC field is set to "Broadcast," the NE proceeds to decision step 740. At decision step 740, the NE determines if an entry exists in an i-MAC Name Table, such as i-MAC Name Table 352, corresponding to the i-MAC Name retrieved from the Name field of the i-MAC Data frame. When no entry exists in the i-MAC Name Table corresponding to the retrieved i-MAC Name, the NE proceeds to step 742. At step 742, the NE drops the Data frame and the method ends.

Returning to decision step 740 when an entry exists in the i-MAC Name Table corresponding to the retrieved i-MAC Name, the NE proceeds to step 744. At step 744, the NE updates the content ports attribute for the entry by adding the inbound port and updates the MAC Address Table with a record for the Source MAC field from the i-MAC Data Frame and the inbound port. At step 746, the NE retrieves the Data Packet from the ICN Payload field of the i-MAC Data Frame (e.g., strips the i-MAC Based Frame headers). At step 748, the NE sends the Data Packet to the ICN layer and the method ends.

Returning to decision step 730 when the Destination MAC field is not set to "Broadcast," the NE proceeds to decision step 750. At decision step 750, the NE determines if the Destination MAC field references the MAC address of the NE. When the Destination MAC field does not reference the MAC address of the NE, the NE proceeds to step 742. When the Destination MAC field references the MAC address of the NE, the NE proceeds to step 746. At step 746, the NE retrieves the Data Packet from the ICN Payload field of the i-MAC Data Frame (e.g., strips the i-MAC Based Frame headers). At step 748, the NE sends the Data Packet to the ICN layer and the method ends.

Figure 8:
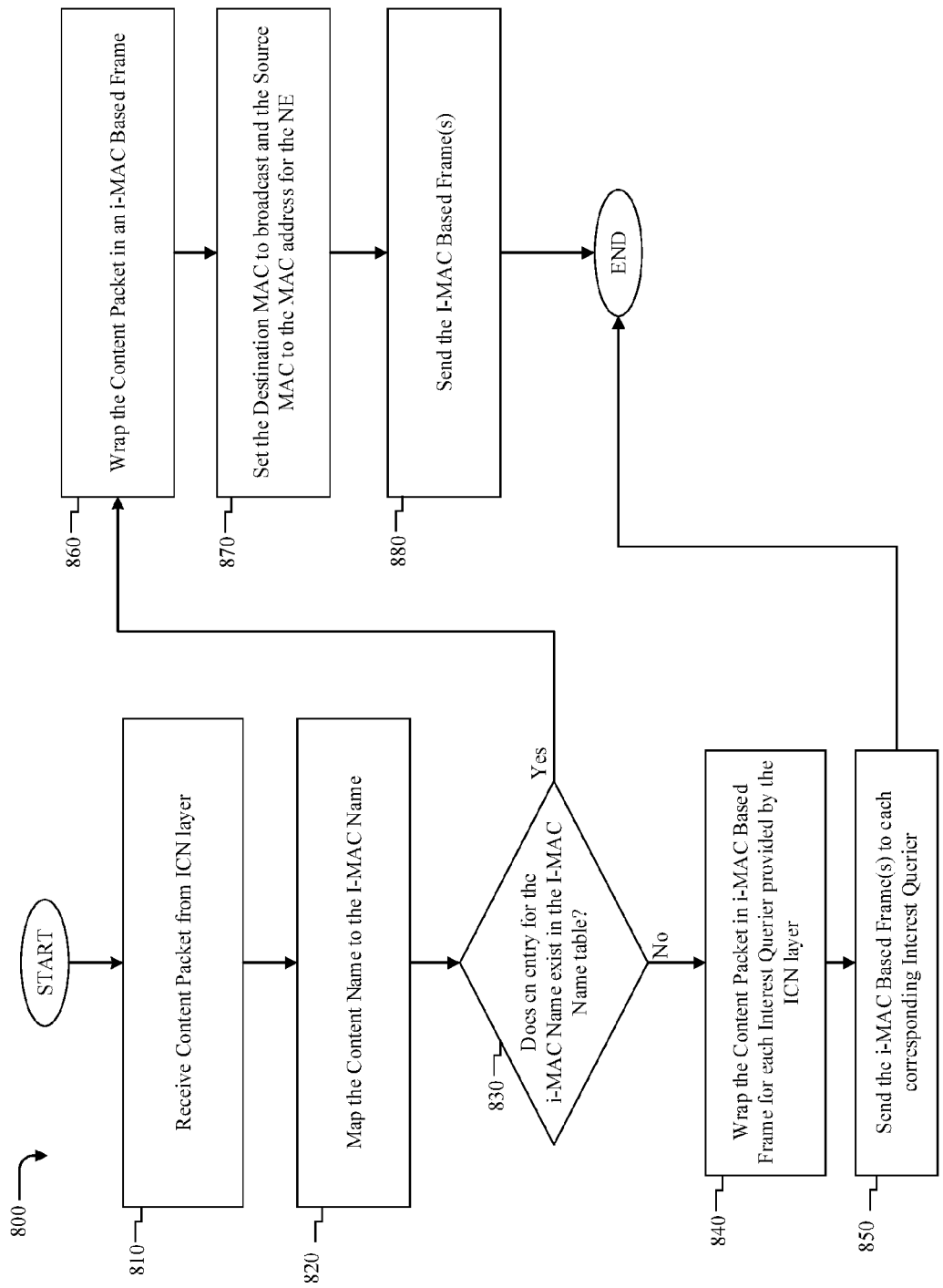
FIG. 8 is a flowchart of an embodiment of a method of sending an i-MAC Data Frame from a content-host NE within an i-MAC Layer of an i-MAC enabled network system.

FIG. 8 is a flowchart of an embodiment of a method 800 of sending an i-MAC Data Frame from a content-host NE within an i-MAC Layer of an i-MAC enabled network system, such as i-MAC enabled network system 100. The method 800 is implemented by the content-host NE such as the ICN client nodes 110, i-MAC enabled switches 122, and/or NEs 200 and 300 within the i-MAC Layer. The method 800 is implemented when the content-host NE receives a content-centric Data Packet from an ICN Layer. At step 810, the NE receives a content-centric Data Packet from an ICN layer. At step 820, the NE maps a Name of the Content (Content Name) included in the Data Packet payload to an i-MAC Name (e.g., HashId) by creating a hash of the Content Name. At decision step 830, the NE determines if an entry exists in an i-MAC Name Table, such as i-MAC Name Table 352, corresponding to the i-MAC Name. When an entry corresponding to the i-MAC Name does not exist in the i-MAC Name Table, the NE proceeds to step 840. At step 840, the NE creates an i-MAC Data Frame for each Interest Querier provided by the ICN layer by creating an i-MAC Based Frame, such as i-MAC Based Frame 400, and setting the ICN Payload field to the received content-centric Data Packet and the Name field to the i-MAC Name. At step 850, the NE sends each i-MAC Data Frame(s) to a corresponding Interest Querier based on the MAC address for the Interest Querier provided by the ICN layer and the process ends.

Returning to step 830 when an entry corresponding to the i-MAC Name exists in the i-MAC Name Table, the NE proceeds to step 860. The entry comprises a list of ports on the NE that have received an Interest Frame for the i-MAC Name in the interest ports attribute. At step 860, creates an i-MAC Data Frame by creating an i-MAC Based Frame, such as i-MAC Based Frame 400, and setting the ICN Payload field to the received content-centric Data Packet and the Name field to the i-MAC Name. At step 870, the NE sets the Destination MAC field of the i-MAC Data Frame to "Broadcast" and the Source MAC of the Data Frame to the MAC address of the NE. At step 880, the NE sends the Data Fame via each port listed in the Interest Port attribute of the retrieved entry and the process ends.

Figure 9A:
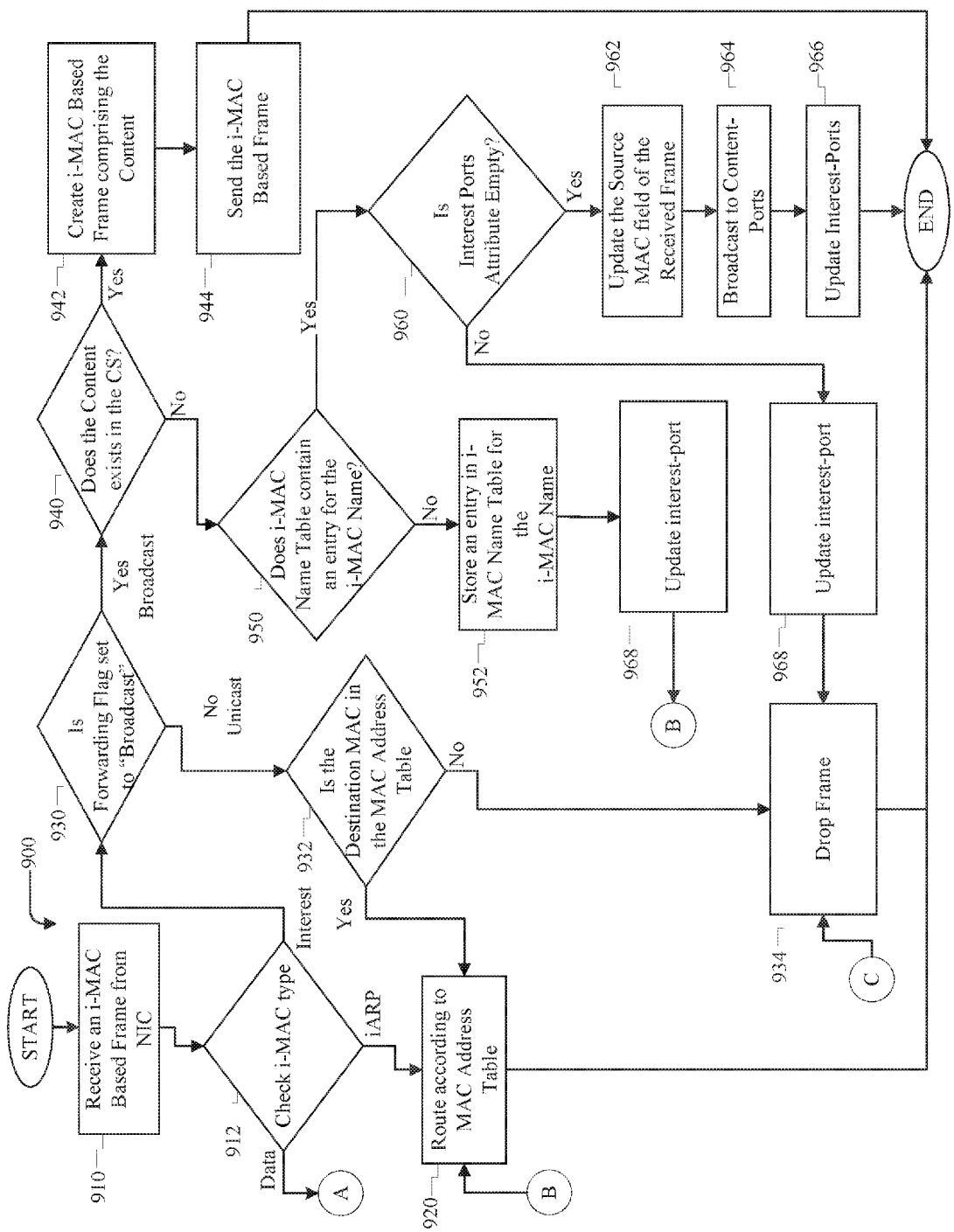
FIGS. 9A and 9B are a flowchart of an embodiment of a method of handling a received i-MAC Based Frame that includes an Interest Packet, a Data Packet, or an Information Centric Address Resolution Protocol (i-ARP) message within an i-MAC Layer of an i-MAC enabled network system.
Figure 9B:
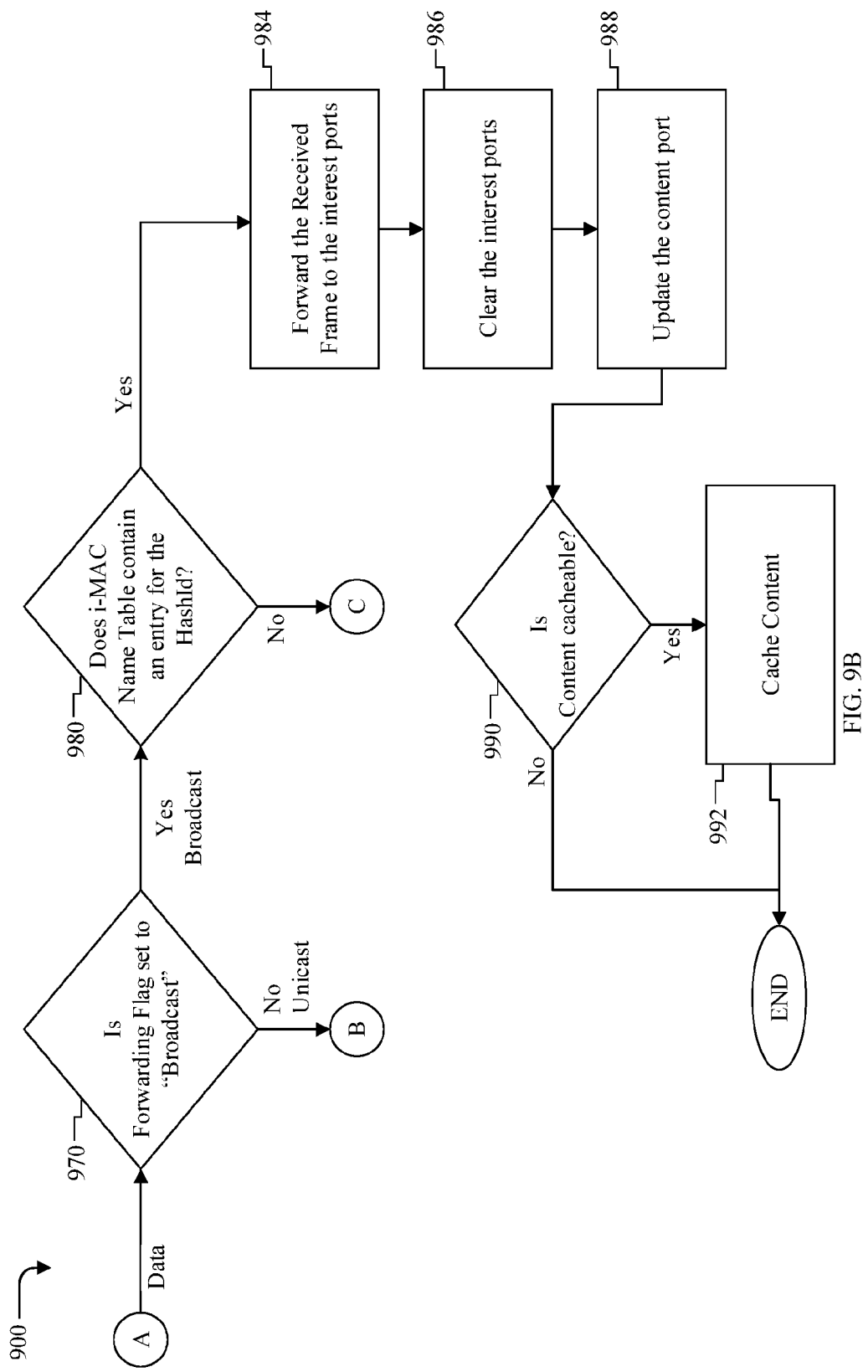

FIGS. 9A and 9B are a flowchart of an embodiment of a method 900 of handling a received i-MAC Based Frame (referred to hereinafter as "Received Frame"), such as i-MAC Based Frame 400, that includes an Interest Packet, a Data Packet, or an i-ARP message within an i-MAC Layer of an i-MAC enabled network system, such as an i-MAC enabled network system 100. Method 900 is implemented by an NE such as ICN client nodes 110, i-MAC enabled switches 122, and/or NEs 200 and 300 within an i-MAC Layer. Method 900 is implemented when the NE receives the Received Frame from an NIC via an inbound port (referred to hereinafter as "receiving port"), such as downstream ports 210 or upstream ports 240. At step 910, the NE parses the ICN payload of the Received Frame. At decision step 912, the NE determines the content of the ICN Payload of the Received Frame. When the ICN Payload includes an i-ARP message, the NE proceeds to step 920. At step 920, the NE routes the Received Frame according to the listed ports in a record(s) in a MAC Address Table, such as MAC Address Table 354, corresponding to the Destination MAC contained in the Destination MAC field of the Received Frame. The method ends after completing step 920.

Returning to decision step 912, when the ICN Payload of the Received Frame includes an Interest Packet, the NE proceeds to decision step 930. At decision step 930, the NE parses the Forwarding Flag field of the Received Frame. When the Forwarding flag is not set to "Broadcast," the NE proceeds to decision step 932. At decision step 932, the NE parses the Destination MAC field of the Received Frame for a Destination MAC address and determines if an entry exists in the MAC Address Table corresponding to the Destination MAC address. If an entry exists, the NE proceeds to step 920. If no entry exists, the NE proceeds to step 934. At step 934, the NE drops the Received Frame and the method ends.

Returning to decision step 930 when the Forwarding flag is set to "Broadcast," the NE proceeds to decision step 940. At decision step 940, the NE retrieves the requested Content Name from the i-MAC Interest Frame and determines whether content corresponding to the requested Content Name is stored within an i-MAC switch cache (e.g., a content store), such as i-MAC switch cache 226, partitioned on a memory component, such as memory components 250 and/or 350, of the NE. When content matching the requested Content Name is stored on the memory component, the NE proceeds to step 942. At step 942, the NE creates an i-MAC Based Frame (referred to hereinafter as a "Created Frame") and the NE sets the Destination MAC field to "Broadcast," the Source MAC to the MAC address of the NE, the Name field to the i-MAC Name from the Name field of the Received Frame, and the ICN Payload to the retrieved content. The retrieved content is the ICN content object, which is encapsulated in the i-MAC Content Frame. At step 944, the NE responds to the Received Frame by sending the Created Frame via the receiving port and the method ends.

Returning to decision step 940 when content matching the requested content name is not stored on the memory component, the NE proceeds to decision step 950. At decision step 950, the NE parses the Name field of the Received Frame to determine an i-MAC Name corresponding to a requested Content Name and searches for an entry that corresponds to the i-MAC Name in an i-MAC Name Table, such as i-MAC Name Table 352. When an entry is found in the i-MAC Name Table, the NE proceeds to step decision step 960. At decision step 960, the NE determines whether the interest ports attribute for the entry is null. When the interest ports attribute is not null (e.g., the attribute contains a list of in-ports), the NE proceeds to step 968. At step 968, the NE updates the interest ports attribute of the entry by adding the receiving port and proceeds to step 934.

Returning to decision step 960 when the interest ports attribute is null (e.g., the attribute contains no in-ports), the NE proceeds to step 962. At step 962, the NE updates the Source MAC field on the Received Frame. At step 964, the NE broadcast the Received Frame via the ports listed in the content ports attribute of the entry. At step 966, the NE updates the interest ports attribute of the entry by adding the receiving port and the method ends.

Returning to decision step 950, when an entry is not found in the i-MAC Name Table corresponding to the i-MAC Name, the NE proceeds to step 952. At step 952, the NE stores an entry in the i-MAC Table. The name attribute of the stored entry is set to the i-MAC Name and the interest-ports attribute is set to the receiving port and the process proceeds to step 920.

Returning to decision step 912, when the ICN Payload of the received i-MAC Based Frame includes a Data Packet, the NE proceeds to decision step 960 (FIG. 9B). At decision step 960, the NE parses the Forwarding Flag field of the received i-MAC Based Frame. When the Forwarding Flag is not set "Broadcast," the NE proceeds to step 920. When the Forwarding Flag is set to "Broadcast," the NE proceeds to decision step 970. At decision step 970, the NE parses the Name field of the Received Frame to determine an i-MAC Name corresponding to a requested Content Name and searches for an entry that corresponds to the i-MAC Name in the i-MAC Name Table. When an entry is not found in the i-MAC Name Table, the NE proceeds to step 934. When an entry is found in the i-MAC Name Table, the NE proceeds to step 982. At step 984, the NE forwards the Received Frame via the ports listed in the interest ports attribute of the i-MAC Name Table entry. At step 986, the NE clears the interest ports attribute of the i-MAC Name Table entry. At step 988, the NE updates the content ports attribute of the i-MAC Name Table entry by adding the receiving port. At decision step 990, the NE determines whether the Content contained in the ICN Payload field of the Received Frame is cacheable. The NE may determine whether Content is cacheable based on attributes associated with the Content, such as a popularity score determined by a number of times the NE has received a Frame comprising the Content and/or an Interest Packet requesting the Content. The NE may also determine whether Content is cacheable based on storage rules, which include an amount of current storage space on the NE and/or a default storage time for stored content. When the Content is determined to not be cacheable, the method ends. When the Content is determined to be cacheable, the NE proceeds to step 992. At step 992, the NE caches the Content in the i-MAC switch cache and the method ends.

In an embodiment, a network element (NE) includes means receiving an Information-Centric Media Access Control (i-MAC) frame, means for determining whether an i-MAC table includes routing information for the i-MAC Based Frame, and means for routing the i-MAC Based Frame based on the i-MAC table when the i-MAC table includes information corresponding to the i-MAC Based Frame, and routing the i-MAC Based Frame based on a layer 2 (L2) MAC Address Table when the i-MAC table does not contain information corresponding to the i-MAC Based Frame.

In an embodiment, a network element (NE) transmits an Information-Centric Media Access Control (i-MAC) frame using means for receiving a content-centric interest packet via an Information Centric Network (ICN) layer, means for hashing a content name extracted from the content-centric interest packet to generate an i-MAC name, means for generating an i-MAC frame using the content-centric interest packet and the i-MAC name, and means for transmitting the i-MAC frame toward a destination node.

In an embodiment, a content-host network element (NE) within an i-MAC Layer of an i-MAC enabled network handles an Information-Centric Media Access Control (i-MAC) Interest Frame with means for determining whether a Destination MAC field of the i-MAC Interest Frame is set to broadcast, means for retrieving an interest packet from an Information Centric Network (ICN) payload of the i-MAC Interest Frame when the Destination field is not set to broadcast, means for parsing the i-MAC Interest Frame to obtain an i-MAC name from a Name field of the i-MAC Interest Frame and determining whether an entry in an i-MAC Name Table corresponding to the i-MAC name exists, means for creating the entry in the i-MAC Name Table and retrieving the interest packet from an ICN payload of the i-MAC Interest Frame when the entry does not exist, means for updating the entry in the i-MAC Name Table, retrieving the interest packet from an ICN payload of the i-MAC Interest Frame, and setting a Source field in the interest packet to broadcast when the entry does exist, and means for transmitting the interest packet toward a destination node.

In an embodiment, a content-host network element (NE) within an i-MAC Layer of an i-MAC enabled network handles an Information-Centric Media Access Control (i-MAC) Content Frame using means for parsing a Name field of the i-MAC Content Frame to obtain an i-MAC name corresponding to a requested content and to determine whether a Destination MAC field is set to broadcast, means for determining whether an entry in an i-MAC Name Table corresponding to the i-MAC name exists when the Destination MAC field is set to broadcast, updating the i-MAC table with an inbound port of the i-MAC Content Frame, and retrieving a data packet from the i-MAC Content Frame, means for determining whether a Destination MAC field of the i-MAC Content Frame references the NE when the Destination MAC field is not set to broadcast and retrieving the data packet from the i-MAC Content Frame when the Destination MAC field references the NE, and means for transmitting the data packet toward a destination node when the data packet is retrieved from the i-MAC Content Frame.

In an embodiment, a content-host network element (NE) within an i-MAC Layer of an i-MAC enabled network transmits an Information-Centric Media Access Control (i-MAC) Content Frame using means for hashing a content name from a content-centric data packet to generate an i-MAC name, means for determining whether an entry in an i-MAC Name Table corresponding to the i-MAC name exists, means for generating an i-MAC Content Frame with a Destination MAC field set to broadcast and a Source MAC field to a MAC address of the NE when the entry exists in the i-MAC Name Table, wherein the i-MAC name is inserted in a Name field and the content-centric data packet is inserted in a Payload field, and wherein the entry comprises a list of ports on the NE that have received an Interest Frame for the i-MAC name, nanes for generating the i-MAC Content Frame for each Interest Querier when the entry does not exist in the i-MAC Name Table, wherein the i-MAC name is inserted in a Name field and the content-centric data packet is inserted in the Payload field, and means for transmitting the i-MAC Content Frame to each corresponding Interest Querier when the entry did not exist in the i-MAC Name Table, and via each port when the entry existed in the i-MAC Name Table.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In an embodiment, network element (NE) includes means for receiving an Information-Centric Media Access Control (i-MAC) frame, means for determining whether an i-MAC table includes routing information for the i-MAC Based Frame, and means for routing the i-MAC Based Frame based on the i-MAC table when the i-MAC table includes information corresponding to the i-MAC Based Frame, and routing the i-MAC Based Frame based on a layer 2 (L2) MAC Address Table when the i-MAC table does not contain information corresponding to the i-MAC Based Frame.

In an embodiment, a method of transmitting an Information-Centric Media Access Control (i-MAC) frame by a network element (NE) includes means for receiving a content-centric interest packet via an Information-Centric Network (ICN) layer, means for hashing a content name extracted from the content-centric interest packet to generate an i-MAC name, means for generating an i-MAC frame using the content-centric interest packet and the i-MAC name, and means for transmitting the i-MAC frame toward a destination node.

In an embodiment, a method of handling an Information-Centric Media Access Control (i-MAC) Interest Frame received by a content-host network element (NE) within an i-MAC Layer of an i-MAC enabled network includes means for determining whether a Destination MAC field of the i-MAC Interest Frame is set to broadcast, means for retrieving, by the processor, an interest packet from an Information Centric Network (ICN) payload of the i-MAC Interest Frame when the destination MAC field is not set to broadcast, means for parsing the i-MAC Interest Frame to obtain an i-MAC name from a Name field of the i-MAC Interest Frame and determining whether an entry in an i-MAC Name Table corresponding to the i-MAC name exists, means for creating the entry in the i-MAC Name Table and retrieving the interest packet from an ICN Payload of the i-MAC Interest Frame when the entry does not exist, means for updating the entry in the i-MAC Name Table, retrieving the interest packet from an ICN payload of the i-MAC Interest Frame, and setting a Source field in the interest packet to broadcast when the entry does exist, and means for transmitting the interest packet toward a destination node.

In an embodiment, a method of handling an Information-Centric Media Access Control (i-MAC) content frame received by a content-host network element (NE) within an i-MAC Layer of an i-MAC enabled network includes means for parsing a name field of the i-MAC Content Frame to obtain an i-MAC name corresponding to a requested content and to determine whether a Destination MAC field is set to broadcast, means for determining whether an entry in an i-MAC Name Table corresponding to the i-MAC name exists when the Destination MAC field is set to broadcast, updating the i-MAC table with an inbound port of the i-MAC Content Frame, and retrieving a data packet from the i-MAC Content Frame, means for determining whether a Destination MAC field of the i-MAC Content Frame references the NE when the Destination MAC field is not set to broadcast and retrieving the data packet from the i-MAC Content Frame when the Destination MAC field references the NE, and means for transmitting the data packet toward a destination node when the data packet is retrieved from the i-MAC Content Frame.

In an embodiment, a content-host network element (NE) within an Information-Centric Media Access Control (i-MAC) Layer of an i-MAC enabled network including means for hashing a content name from a content-centric data packet to generate an i-MAC name, means for determining whether an entry in an i-MAC Name Table corresponding to the i-MAC name exists, means for generating an i-MAC Content Frame with a Destination MAC field set to broadcast and a source MAC field to a MAC address of the NE when the entry exists in the i-MAC Name Table, wherein the i-MAC name is inserted in a name field and the content-centric data packet is inserted in a payload field, and wherein the entry comprises a list of ports on the NE that have received an Interest Frame for the i-MAC name, means for generating the i-MAC Content Frame for each Interest Querier when the entry does not exist in the i-MAC Name Table, wherein the i-MAC name is inserted in a name field and the content-centric data packet is inserted in the payload field, and means for transmitting the i-MAC Content Frame to each corresponding Interest Querier when the entry did not exist in the i-MAC Name Table, and via each port when the entry existed in the i-MAC Name Table.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE), comprising:
a receiver configured to receive an Information-Centric Media Access Control (i-MAC) Based Frame;
a processor operably coupled to the receiver and configured to:
determine whether an i-MAC table includes routing information for the i-MAC Based Frame;
check an i-MAC type when the i-MAC Based Frame is an i-MAC Based Interest Frame received from a network interface card (NIC) and determine whether a forwarding flag is set to broadcast when an Information Centric Network (ICN) Payload of the i-MAC Based Frame includes an Interest Packet, wherein the i-MAC Based Interest Frame follows a source/destination MAC table for switching when an entry for switching does not exist in the i-MAC table; and
after a determination that an interest ports attribute in the i-MAC table is empty, update a source MAC field of the i-MAC Based Frame, broadcast the i-MAC Based Frame via ports listed in a content ports attribute in the i-MAC table, and update the interest ports attribute by adding a receiving port; and
a transmitter operably coupled to the processor and configured to:
route the i-MAC Based Frame based on the i-MAC table when the i-MAC table includes information corresponding to the i-MAC Based Frame; and
route the i-MAC Based Frame based on a layer 2 (L2) MAC Address Table when the i-MAC table does not contain the information corresponding to the i-MAC Based Frame.

2. The NE of claim 1, wherein the NE includes a cache configured to store content obtained from a payload of the i-MAC Based Frame, and wherein the content is encapsulated within an i-MAC enabled frame and transmitted in response to a request for the content.

3. The NE of claim 1, wherein the processor is configured to retrieve a requested content name from the i-MAC Based Interest Frame and determine whether corresponding content is stored within a cache, wherein the processor updates an interest-port entry in the i-MAC table when the content is not stored within the cache, and wherein the processor drops the i-MAC Based Interest when an i-MAC name is already in the i-MAC table.

4. The NE of claim 1, wherein the NE pushes an i-MAC Content Frame through listed ports from an interest-port table when the NE receives the i-MAC Content Frame, and wherein interest-port table entries for a name are cleared and a content port entry in the i-MAC table is updated with an index of a content store and an outgoing port when the i-MAC table contains an entry for a hash identifier.

5. A content-host network element (NE) for transmitting an Information-Centric Media Access Control (i-MAC) Based Frame, comprising:
a memory; and
a processor operably coupled to the memory and configured to:
receive a content-centric interest packet via an Information-Centric Network (ICN) layer;
use a content name extracted from the content-centric interest packet to generate an i-MAC name; and
generate an i-MAC frame using the content-centric interest packet and the i-MAC name;
determine whether a Destination MAC field of an i-MAC Based Interest Frame is set to broadcast;
retrieve an interest packet from an Information Centric Network (ICN) payload of the i-MAC Based Interest Frame when the Destination MAC field is not set to broadcast;
parse the i-MAC Based Interest Frame to obtain an i-MAC name from a Name field and determine whether an entry in an i-MAC Name Table corresponding to the i-MAC name exists;
create the entry in the i-MAC Name Table and retrieve the interest packet from the ICN Payload of the i-MAC Based Interest Frame when the entry does not exist; and
update the entry in the i-MAC Name Table, retrieve the interest packet from the ICN payload of the i-MAC Based Interest Frame, and set a Source field in the interest packet to broadcast when the entry does exist; and
a transmitter operably coupled to the processor and configured to transmit the interest packet and the i-MAC frame toward a destination node.

6. The content-host NE of claim 5, wherein the processor is further configured to hash the content name extracted from the content-centric interest packet and to generate the i-MAC frame by inserting the content-centric interest packet into a Payload field of the i-MAC frame and the i-MAC name into a Name field of the i-MAC frame.

7. The content-host NE of claim 6, wherein the processor is further configured to determine that a mode of forwarding is set to broadcast, instruct the transmitter to broadcast the i-MAC Based Frame, and create an entry in an i-MAC Name Table of the content-host NE.

8. The content-host NE of claim 6, wherein the processor is further configured to determine that a mode of forwarding is not set to broadcast and set a Destination MAC field to a MAC address of the destination node.

9. The content-host NE of claim 6, wherein the processor is further configured to determine that a mode of forwarding is not set to broadcast, retrieve a MAC address of the destination node from an Information Centric Address Resolution Protocol (i-ARP) Reply, and set a Destination MAC field to the MAC address of the destination node.

10. The content-host NE of claim 5, wherein the processor is further configured to generate the i-MAC Based Frame by inserting a MAC address of the content-host NE into a Source MAC field and set a forwarding flag to a mode of forwarding of the content-centric interest packet.

11. The content-host NE of claim 5, wherein a receiver operably coupled to the processor is configured to receive the i-MAC Based Frame prior to the determining step, wherein the i-MAC Based Frame is checked by the processor to determine an i-MAC type.

12. The content-host NE of claim 9, wherein the i-ARP Reply is sent by the transmitter when the i-MAC Based Frame is an i-ARP Frame and there is an i-ARP Name match, and wherein the determination of whether the Destination MAC field of the i-MAC Based Interest Frame is set to broadcast is made by the processor when the i-MAC Based Frame is an Interest Frame.

13. A content-host network element (NE) for handling an Information-Centric Media Access Control (i-MAC) Content Frame received within an i-MAC Layer of an i-MAC enabled network, comprising:
a memory;
a processor operably coupled to the memory and configured to:
parse a name field of the i-MAC Content Frame to obtain an i-MAC name corresponding to a requested content and to determine whether a Destination MAC field is set to broadcast;
determine whether an entry in an i-MAC Name Table corresponding to the i-MAC name exists when the Destination MAC field is set to broadcast, update an i-MAC table with an inbound port of the i-MAC Content Frame, and retrieve a data packet from the i-MAC Content Frame; and
determine whether the Destination MAC field of the i-MAC Content Frame references the content-host NE when the Destination MAC field is not set to broadcast and retrieve the data packet from the i-MAC Content Frame when the Destination MAC field references the content-host NE;
hash a content name from a content-centric data packet to generate the i-MAC name;
determine whether an entry in the i-MAC Name Table corresponding to the i-MAC name exists;
generate an i-MAC Content Frame with the Destination MAC field set to broadcast and a source MAC field to a MAC address of the NE when the entry exists in the i-MAC Name Table, wherein the i-MAC name is inserted in a name field and the content-centric data packet is inserted in a payload field, and wherein the entry comprises a list of ports on the NE that have received an Interest Frame for the i-MAC name;
generate the i-MAC Content Frame for each Interest Querier when the entry does not exist in the i-MAC Name Table, wherein the i-MAC name is inserted in a name field and the content-centric data packet is inserted in the payload field; and
a transmitter operably coupled to the processor and configured to transmit the data packet toward a destination node when the data packet is retrieved from the i-MAC Content Frame, transmit the i-MAC Content Frame to each corresponding Interest Querier when the entry did not exist in the i-MAC Name Table, and transmit the i-MAC Content Frame via each port when the entry existed in the i-MAC Name Table.

14. The content-host NE of claim 13, wherein the processor is further configured to update a MAC Address Table with a record for the inbound port of the i-MAC Content Frame and a source MAC field from the i-MAC Content Frame.

15. The content-host NE of claim 13, wherein the processor is further configured to receive the i-MAC Content Frame from a network interface card (NIC) via an inbound port of the NE.

16. The content-host NE of claim 13, wherein each of the Interest Queriers is provided via an Information-Centric Network (ICN) layer, and wherein a receiver operably coupled to the processor is configured to receive the content-centric data packet via the ICN layer.

* * * * *

UNITED STATES PATENT AND TRADEMARK OFFICE
CERTIFICATE OF CORRECTION

PATENT NO. : 10,164,910 B2  
APPLICATION NO. : 15/208840  
DATED : December 25, 2018  
INVENTOR(S) : Ravishankar Ravindran et al.

It is certified that error appears in the above-identified patent and that said Letters Patent is hereby corrected as shown below:

In the Claims

Column 20, Lines 53-60, Claim 3 should read as:
3. The NE of claim 1, wherein the processor is configured to retrieve a requested content name from the i-MAC Based Interest Frame and determine whether corresponding content is stored within a cache, wherein the processor updates an interest-port entry in the i-MAC table when the content is not stored within the cache, and wherein the processor drops the i-MAC Based Interest Frame when an i-MAC name is already in the i-MAC table.

Signed and Sealed this  
Twelfth Day of February, 2019

Andrei Iancu  
*Director of the United States Patent and Trademark Office*